United States Patent
Yarlagadda et al.

(10) Patent No.: US 11,017,513 B1
(45) Date of Patent: May 25, 2021

(54) ACTIVE SENSOR FUSION SYSTEMS AND METHODS FOR OBJECT DETECTION

(71) Applicant: Amazon Technologies, Inc., Seattle, WA (US)

(72) Inventors: Pradeep Krishna Yarlagadda, Issaquah, WA (US); Jean-Guillaume Dominique Durand, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 96 days.

(21) Appl. No.: 16/367,857

(22) Filed: Mar. 28, 2019

(51) Int. Cl.
*G06T 5/50* (2006.01)
*G06T 7/70* (2017.01)
*B64C 39/02* (2006.01)

(52) U.S. Cl.
CPC .............. *G06T 5/50* (2013.01); *B64C 39/024* (2013.01); *G06T 7/70* (2017.01); *B64C 2201/123* (2013.01); *B64C 2201/141* (2013.01); *G06T 2207/10032* (2013.01); *G06T 2207/20221* (2013.01); *G06T 2207/30248* (2013.01)

(58) Field of Classification Search
CPC .......................... G06N 20/00; H04N 5/23238
USPC .............................. 382/103, 104; 348/51, 36
See application file for complete search history.

(56) References Cited

U.S. PATENT DOCUMENTS

2009/0103779 A1* 4/2009 Loehlein ................ G06K 9/629
382/103
2015/0310281 A1* 10/2015 Zhu ..................... G06K 9/00805
382/104

* cited by examiner

*Primary Examiner* — Kiet M Doan
(74) *Attorney, Agent, or Firm* — Athorus, PLLC

(57) ABSTRACT

Active sensor fusion systems and methods may include a plurality of sensors, a plurality of detection algorithms, and an active sensor fusion algorithm. Based on detection hypotheses received from the plurality of detection algorithms, the active sensor fusion algorithm may instruct or direct modifications to one or more of the plurality of sensors or the plurality of detection algorithms. In this manner, operations of the plurality of sensors or processing of the plurality of detection algorithms may be refined or adjusted to provide improved object detection with greater accuracy, speed, and reliability.

22 Claims, 10 Drawing Sheets

ACTIVE SENSOR FUSION SYSTEMS AND METHODS FOR OBJECT DETECTION

BACKGROUND

Unmanned vehicles, such as unmanned aerial vehicles, automated ground vehicles, and water based automated vehicles, are continuing to increase in use. For example, aerial vehicles are often used by hobbyists to obtain aerial images of buildings, landscapes, etc. While there are many beneficial uses of these vehicles, operating and navigating aerial vehicles safely and efficiently within various environments may be challenging. To maintain safety, various object detection and avoidance systems and methods may be incorporated into aerial vehicles, such as radar systems, imaging systems, or others. However, conventional, passive sensor fusion systems may not provide accurate, reliable object detection. Accordingly, there is a need for improved, active sensor fusion systems and methods to detect objects with increased accuracy, speed, and reliability.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical components or features.

Figure 1A:
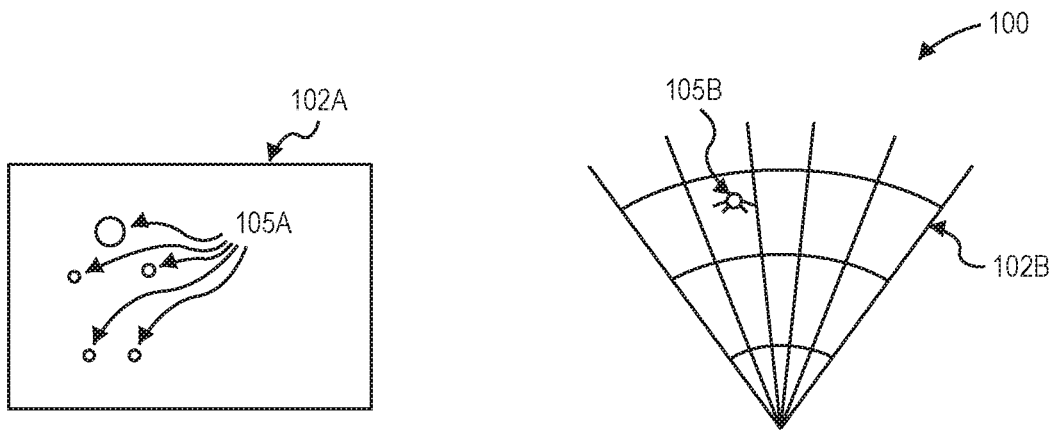
FIGS. 1A-1C are schematic diagrams of an example active sensor fusion system and process to detect objects, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods described herein relate to active sensor fusion systems, algorithms, methods, and processes to detect objects using a plurality of sensors with greater accuracy, reliability, and speed, as well as tracking detected objects over time using a plurality of sensors.

In example embodiments, the active sensor fusion processes may receive detection hypotheses from a plurality of sensors and associated detection algorithms or processes. For example, an imaging sensor may receive or capture imaging data, and various image processing algorithms may process the imaging data to determine a first detection hypothesis. The first detection hypothesis may include any number of detected objects, e.g., zero, one, two, or more objects, and the first detection hypothesis may also include various confidence levels associated with the detected objects. In addition, a radar sensor may receive radiofrequency signal data, and various radiofrequency signal processing algorithms may process the radiofrequency signal data to determine a second detection hypothesis. Likewise, the second detection hypothesis may include any number of detected objects, e.g., zero, one, two, or more objects, and the second detection hypothesis may also include various confidence levels associated with the detected objects.

In addition, an active sensor fusion algorithm or process may receive detection hypotheses from the plurality of sensors and associated detection algorithms or processes, such as the imaging sensor and various image processing algorithms, and the radar sensor and various radiofrequency signal processing algorithms. The active sensor fusion process may analyze, combine, compare, and/or otherwise evaluate the received detection hypotheses in order to make a final detection determination related to various detected objects within an environment.

Further, the active sensor fusion process may provide various detection hypotheses from the plurality of sensors and associated detection algorithms to one or more sensors and associated detection algorithms in order to refine, modify, focus, and/or otherwise adjust one or more of the sensors and/or associated detection algorithms or processes. For example, the imaging sensor and various image processing algorithms may receive the second detection hypothesis output by the radar sensor and various radiofrequency signal processing algorithms, and the radar sensor and various radiofrequency signal processing algorithms may receive the first detection hypothesis output by the imaging sensor and various image processing algorithms. Then, based on the received detection hypotheses from others of the plurality of sensors and associated detection algorithms, one or more parameters of the imaging sensor, various image processing algorithms, the radar sensor, and/or various radiofrequency signal processing algorithms may be refined, modified, focused, and/or otherwise adjusted.

In example embodiments, if the imaging sensor and various image processing algorithms detect a first object at a first location, but the radar sensor and various radiofrequency signal processing algorithms do not detect the first object at the first location, then the detection hypothesis from the imaging sensor and various image processing algorithms may be provided by the active sensor fusion process to the radar sensor and various radiofrequency signal processing algorithms to refine, modify, focus, and/or otherwise adjust one or more parameters of the radar sensor and/or various radiofrequency signal processing algorithms to attempt to detect, confirm, validate, verify, and/or refute the first object detected at the first location. Likewise, the detection hypothesis from the radar sensor and various radiofrequency signal processing algorithms may also be provided by the active sensor fusion process to the imaging sensor and various image processing algorithms to refine, modify, focus, and/or otherwise adjust one or more parameters of the imaging sensor and/or various image processing algorithms to attempt to detect, confirm, validate, verify, and/or refute the first object detected at the first location.

In this manner, detection hypotheses, as well as any other outputs, from one or more detection algorithms associated with respective sensors may be provided to others of the one or more detection algorithms and respective sensors to confirm, validate, verify, refute, and/or otherwise modify the detection hypotheses of one or more sensors and associated detection algorithms. By providing, or feeding back, the detection hypotheses to a plurality of sensors and associated detection algorithms, the active sensor fusion algorithms and processes described herein may improve the accuracy, reliability, and speed of object detection processes that may be used by various types of systems. Accordingly, the systems and methods for active sensor fusion described herein may enhance and improve the classical paradigm of passive sensor fusion systems and methods by adding one or more feedback loops that may actively improve, refine, modify, and/or adjust object detection by one or more sensors and associated detection algorithms using various methods for such improvement or refinement.

Although the description herein generally relates to object detection and/or object tracking by vehicles, such as aerial vehicles, the active sensor fusion systems and methods described herein may also be applicable to other types of vehicles, such as ground-based, water-based, or other types of vehicles. In addition, the active sensor fusion systems and methods described herein may also be applicable to various other automated, semi-automated, autonomous, or robotic machines, apparatus, devices, equipment, or other systems, including but not limited to manufacturing systems, storage systems, supply chain logistics systems, security and safety systems, control systems, or various other types of machines, apparatus, devices, equipment, or systems having a plurality of sensors.

Further, the objects that may be detected as part of the object detection and/or object tracking by the active sensor fusion systems and methods described herein are also not limited. For example, the objects may include, but are not limited to, buildings, structures, signs, signals, natural structures or obstacles, manmade structures or obstacles, roadways, waterways, vehicles, people, animals, items, products, or various other types of objects.

Figure 1B:
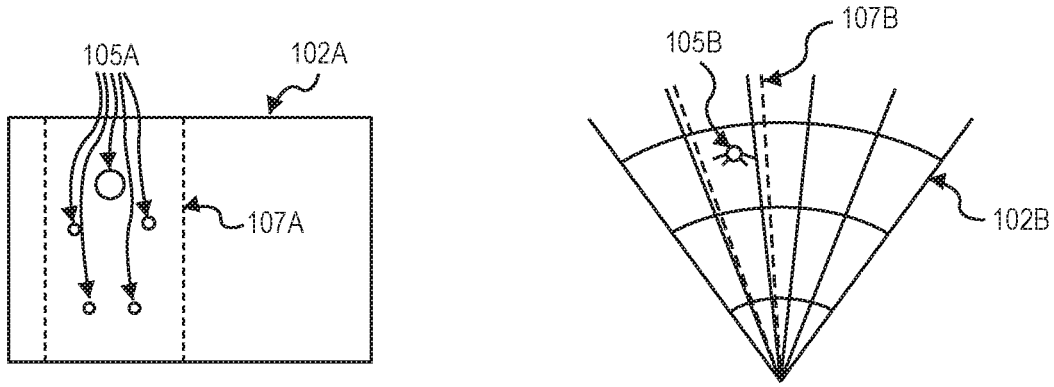
Figure 1C:
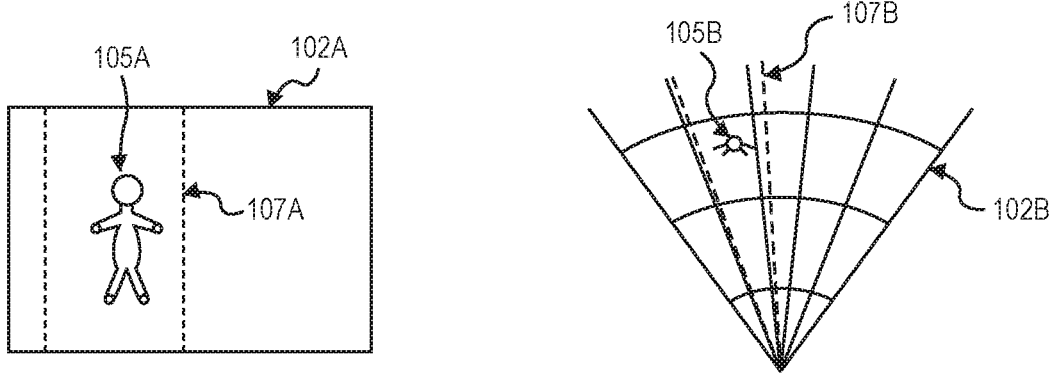

FIGS. 1A-1C are schematic diagrams of an example active sensor fusion system and process 100 to detect objects, in accordance with disclosed implementations.

FIG. 1A illustrates, from a front view, example imaging data 102A that may be captured by an imaging sensor, at the left side of FIG. 1A. The imaging data 102A may be processed by various image processing algorithms or processes to detect one or more objects 105A within the imaging data 102A. As illustrated, the one or more objects 105A may be detected as a plurality of circles or other shapes that appear to be clustered together within the left portion of the imaging data 102A.

FIG. 1A also illustrates, from an overhead view, example radar data 102B that may be captured by a radar sensor, at the right side of FIG. 1A. The radar sensor may have a field of view that is substantially the same as or overlapping a field of view of the imaging sensor. The radar data 102B may be processed by various radiofrequency signal processing algorithms or processes to detect one or more objects 105B within the radar data 102B. As illustrated, the one or more objects 105B may be detected as a person who is standing within the left portion of the radar data 102B.

In example embodiments, the objects 105A detected within the imaging data 102A may be associated with a low confidence level, e.g., below a confidence threshold, and the objects 105B detected within the radar data 102B may be associated with a high confidence level, e.g., above a confidence threshold. The detected objects 105A, 105B may be provided to an active sensor fusion algorithm or process as respective detection hypotheses. In addition, respective confidence levels associated with the detected objects 105A, 105B, as well as imaging data 102A, radar data 102B, data associated with the imaging sensor, data associated with the radar sensor, data associated with the image processing algorithms, data associated with the radiofrequency signal processing algorithms, and/or any other data, may also be included as part of the respective detection hypotheses. Based on an analysis of the detection hypotheses associated with the imaging data 102A and radar data 102B and detected objects 105A, 105B, the active sensor fusion algorithm may determine that objects 105B, e.g., a person detected within the radar data 102B, are detected with a high confidence level. However, because detection hypothesis associated with the imaging data 102A did not also detect the person with a high confidence level, the active sensor fusion algorithm may provide the detection hypothesis associated with the radar data 102B to the various image processing algorithms or processes and/or the imaging sensor associated with the imaging data 102A.

Continuing to FIG. 1B, FIG. 1B illustrates, from a front view, example imaging data 102A that may again be captured by an imaging sensor, at the left side of FIG. 1B. Based on the detection hypothesis associated with the radar data 102B that is received from the active sensor fusion algorithm by the various image processing algorithms or processes and/or the imaging sensor, one or more parameters of the various image processing algorithms or processes and/or the imaging sensor may be refined, modified, focused, and/or adjusted in order to detect, confirm, validate, verify, and/or refute the objects 105B detected as part of the detection hypothesis associated with the radar data 102B. For example, as shown in FIG. 1B, the various image processing algorithms may be modified to focus within a portion 107A of the imaging data 102A within which the person is expected to be detected. Various other processing parameters of the various image processing algorithms may also be modified, as further described herein. In addition or alternatively, various operational parameters of the imaging sensor may also be modified, as further described herein. In this manner, the imaging data 102A may be processed by various image processing algorithms or processes with various modified processing parameters to detect one or more objects 105A within the imaging data 102A. As illustrated, the one or more objects 105A may initially be detected as a plurality of circles or other shapes that appear to be clustered together within the left portion of the imaging data 102A.

FIG. 1B also illustrates, from an overhead view, example radar data 102B that may again be captured by a radar sensor, at the right side of FIG. 1B. The radar sensor may have a field of view that is substantially the same as or overlapping a field of view of the imaging sensor. The radar data 102B may be processed by various radiofrequency signal processing algorithms or processes to detect one or more objects 105B within the radar data 102B. As illustrated, the one or more objects 105B may again be detected as a person who is standing within the left portion of the radar data 102B, which may further increase, confirm, validate, and/or verify the detection hypothesis and/or the confidence level associated with the detected objects 105B.

In the illustrated example of FIGS. 1A and 1B, based on the objects 105B detected within the radar data 102B, various data related to the detected objects 105B may be determined. For example, a position or orientation of the objects 105B within the radar data 102B may be determined, a bounding box or volume 107B around the objects 105B may be determined, one or more points, edges, lines, or corners around an outer periphery of the objects 105B may be determined, and/or various other aspects or characteristics of the objects 105B may be determined, such as size, shape, color, reflectivity, surface features, surface texture, heading, speed, or other aspects or characteristics. Then, continuing with the illustrated example of FIGS. 1A and 1B, based on one or more of the determined aspects or characteristics of objects 105B, such as a bounding box or volume 107B of the objects 105B within the radar data 102B, an imaging sensor and/or image processing algorithms may focus on a portion of the imaging data corresponding to the bounding box or volume 107B of the objects 105B, e.g., with reference to respective fields of view of each of the radar sensor that is capturing the radar data 102B and the imaging sensor that is capturing the imaging data 102A.

Moving on to FIG. 1C, FIG. 1C illustrates, from a front view, example imaging data 102A that may again be captured by an imaging sensor, at the left side of FIG. 1C. Based on the various image processing algorithms with various modified processing parameters, e.g., to focus within a portion 107A of the imaging data 102A within which the person is expected to be detected, the imaging data 102A may be processed to detect one or more objects 105A within the imaging data 102A. As illustrated, the one or more objects 105A may now be detected as a person who is standing within the left portion of the imaging data 102A, which may confirm, validate, and/or verify the detection hypothesis and/or the confidence level associated with the detected objects 105B associated with the radar data 102B.

FIG. 1C also illustrates, from an overhead view, example radar data 102B that may again be captured by a radar sensor, at the right side of FIG. 1C. The radar sensor may have a field of view that is substantially the same as or overlapping a field of view of the imaging sensor. The radar data 102B may be processed by various radiofrequency signal processing algorithms or processes to detect one or more objects 105B within the radar data 102B. As illustrated, the one or more objects 105B may again be detected as a person who is standing within the left portion of the radar data 102B, which may further increase, confirm, validate, and/or verify the detection hypothesis and/or the confidence level associated with the detected objects 105B.

In example embodiments, the objects 105A detected within the imaging data 102A may now be associated with a high confidence level, e.g., above a confidence threshold, and the objects 105B detected within the radar data 102B may also be associated with a high confidence level, e.g., above a confidence threshold. The detected objects 105A, 105B may be provided to an active sensor fusion algorithm or process as respective detection hypotheses. In addition, respective confidence levels associated with the detected objects 105A, 105B, as well as imaging data 102A, radar data 102B, data associated with the imaging sensor, data associated with the radar sensor, data associated with the image processing algorithms, data associated with the radiofrequency signal processing algorithms, and/or any other data, may also be included as part of the respective detection hypotheses. Based on an analysis of the detection hypotheses associated with the imaging data 102A and radar data 102B and detected objects 105A, 105B, the active sensor fusion algorithm may determine that objects 105A, 105B, e.g., a person detected within each of the imaging data 102A and the radar data 102B, are detected with a high confidence level, e.g., above a confidence threshold. In example embodiments, based on a convergence of the detection hypotheses and/or confidence levels associated with the detection hypotheses, the active sensor fusion algorithm may determine that an object is detected at a particular location, as detected by each of the imaging sensor and the radar sensor and associated detection algorithms in this example.

Figure 2A:
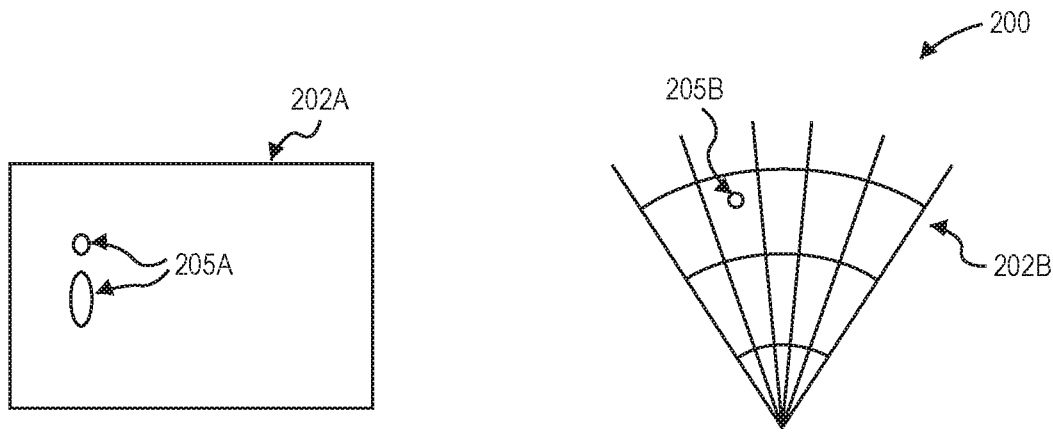
FIGS. 2A-2C are schematic diagrams of another example active sensor fusion system and process to detect objects, in accordance with disclosed implementations.
Figure 2B:
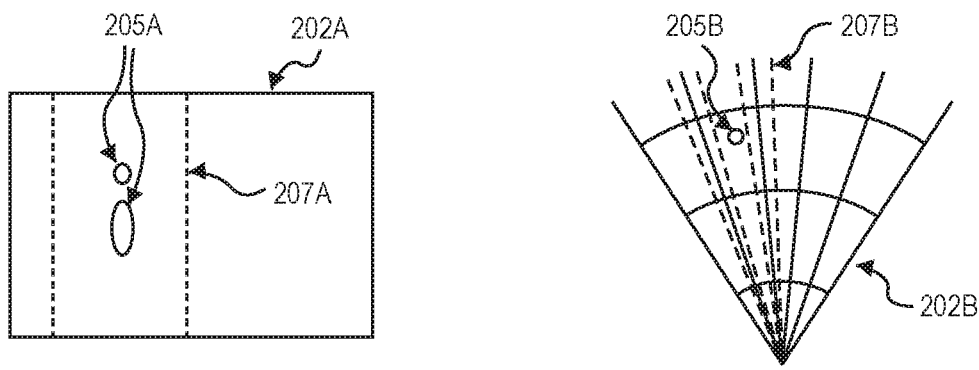
Figure 2C:
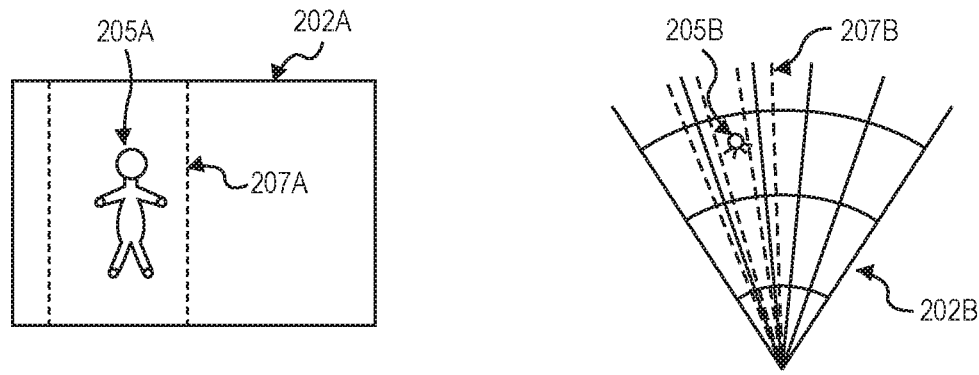

FIGS. 2A-2C are schematic diagrams of another example active sensor fusion system and process 200 to detect objects, in accordance with disclosed implementations.

FIG. 2A illustrates, from a front view, example infrared imaging data 202A that may be captured by an infrared sensor, at the left side of FIG. 2A. The infrared imaging data 202A may be processed by various image processing algorithms or processes to detect one or more objects 205A within the infrared imaging data 202A. As illustrated, the one or more objects 205A may be detected as a plurality of circles or other shapes that appear to be clustered together within the left portion of the infrared imaging data 202A.

FIG. 2A also illustrates, from an overhead view, example sonar data 202B that may be captured by a sonar sensor, at the right side of FIG. 2A. The sonar sensor may have a field of view that is substantially the same as or overlapping a field of view of the infrared imaging sensor. The sonar data 202B may be processed by various audio signal processing algorithms or processes to detect one or more objects 205B within the sonar data 202B. As illustrated, the one or more objects 205B may be detected as a circle or other shape within the left portion of the sonar data 202B.

In example embodiments, the objects 205A detected within the infrared imaging data 202A may be associated with a low confidence level, e.g., below a confidence threshold, and the objects 205B detected within the sonar data 202B may also be associated with a low confidence level, e.g., below a confidence threshold. The detected objects 205A, 205B may be provided to an active sensor fusion algorithm or process as respective detection hypotheses. In addition, respective confidence levels associated with the detected objects 205A, 205B, as well as infrared imaging data 202A, sonar data 202B, data associated with the infrared imaging sensor, data associated with the sonar sensor, data associated with the image processing algorithms, data associated with the audio signal processing algorithms, and/or any other data, may also be included as part of the respective detection hypotheses. Based on an analysis of the detection hypotheses associated with the infrared imaging data 202A and sonar data 202B and detected objects 205A, 205B, the active sensor fusion algorithm may determine that no objects 205A, 205B are detected with a high confidence level. However, because the respective detection hypotheses detected objects 205A, 205B with a low confidence level, the active sensor fusion algorithm may provide the detection hypothesis associated with the sonar data 202B to the various image processing algorithms or processes and/or the infrared imaging sensor associated with the infrared imaging data 202A, and the active sensor fusion algorithm may also provide the detection hypothesis associated with the infrared imaging data 202A to the various audio signal processing algorithms or processes and/or the sonar sensor associated with the sonar data 202B.

Continuing to FIG. 2B, FIG. 2B illustrates, from a front view, example infrared imaging data 202A that may again be captured by an infrared imaging sensor, at the left side of FIG. 2B. Based on the detection hypothesis associated with the sonar data 202B that is received from the active sensor fusion algorithm by the various image processing algorithms or processes and/or the infrared imaging sensor, one or more parameters of the various image processing algorithms or processes and/or the infrared imaging sensor may be refined, modified, focused, and/or adjusted in order to detect, confirm, validate, verify, and/or refute the objects 205B detected as part of the detection hypothesis associated with the sonar data 202B. For example, as shown in FIG. 2B, the various image processing algorithms may be modified to focus within a portion 207A of the infrared imaging data 202A within which the objects 205A are expected to be detected. Various other processing parameters of the various image processing algorithms may also be modified, as further described herein. In addition or alternatively, various operational parameters of the infrared imaging sensor may also be modified, as further described herein. In this manner, the infrared imaging data 202A may be processed by various image processing algorithms or processes with various modified processing parameters to detect one or more objects 205A within the infrared imaging data 202A. As illustrated, the one or more objects 205A may initially be detected as a plurality of circles or other shapes that appear to be clustered together within the left portion of the infrared imaging data 202A.

FIG. 2B also illustrates, from an overhead view, example sonar data 202B that may again be captured by a sonar sensor, at the right side of FIG. 2B. The sonar sensor may have a field of view that is substantially the same as or overlapping a field of view of the infrared imaging sensor. Based on the detection hypothesis associated with the infrared imaging data 202A that is received from the active sensor fusion algorithm by the various audio signal processing algorithms or processes and/or the sonar sensor, one or more parameters of the various audio signal processing algorithms or processes and/or the sonar sensor may be refined, modified, focused, and/or adjusted in order to detect, confirm, validate, verify, and/or refute the objects 205A detected as part of the detection hypothesis associated with the infrared imaging data 202A. For example, as shown in FIG. 2B, the various audio signal processing algorithms may be modified to focus within a portion 207B of the sonar data 202B within which the objects 205B are expected to be detected. Various other processing parameters of the various audio signal processing algorithms may also be modified, as further described herein. In addition or alternatively, various operational parameters of the sonar sensor may also be modified, as further described herein. For example, as shown in FIG. 2B, the sonar sensor may be modified to emit audio signals within a narrow band associated with portion 207B in order to focus the detection of objects 205B within this portion 207B. In this manner, the sonar data 202B may be processed by various audio signal processing algorithms or processes with various modified processing parameters to detect one or more objects 205B within the sonar data 202B. As illustrated, the one or more objects 205B may initially be detected as a plurality of circles or other shapes that appear to be clustered together within the left portion of the sonar data 202B.

In the illustrated example of FIGS. 2A and 2B, based on the objects 205A, 205B detected within the infrared imaging data 202A and sonar data 202B, various data related to the detected objects 205A, 205B may be determined. For example, a position or orientation of the objects 205A, 205B may be determined, a bounding box or volume 207A, 207B around the objects 205A, 205B may be determined, one or more points, edges, lines, or corners around an outer periphery of the objects 205A, 205B may be determined, and/or various other aspects or characteristics of the objects 205A, 205B may be determined, such as size, shape, color, reflectivity, surface features, surface texture, heading, speed, or other aspects or characteristics. Then, continuing with the illustrated example of FIGS. 2A and 2B, based on one or more of the determined aspects or characteristics of objects 205A, 205B, such as a bounding box or volume 207A, 207B of the objects 205A, 205B, various sensors and/or associated detection algorithms may modify respective parameters to improve object detection, such as by focusing on a portion of the sensor data corresponding to the bounding box or volume 207A, 207B of the objects 205A, 205B, e.g., with reference to respective fields of view of each of the sensors that are capturing respective sensor data.

Moving on to FIG. 2C, FIG. 2C illustrates, from a front view, example infrared imaging data 202A that may again be captured by an infrared imaging sensor, at the left side of FIG. 2C. Based on the various image processing algorithms with various modified processing parameters, e.g., to focus within a portion 207A of the infrared imaging data 202A within which the objects 205A are expected to be detected, the infrared imaging data 202A may be processed to detect one or more objects 205A within the infrared imaging data 202A. As illustrated, the one or more objects 205A may now be detected as a person who is standing within the left portion of the infrared imaging data 202A, which may increase, confirm, validate, and/or verify the detection hypothesis and/or the confidence level associated with the detected objects 205A associated with the infrared imaging data 202A and the detected objects 205B associated with the sonar data 202B.

FIG. 2C also illustrates, from an overhead view, example sonar data 202B that may again be captured by a sonar sensor, at the right side of FIG. 2C. The sonar sensor may have a field of view that is substantially the same as or overlapping a field of view of the infrared imaging sensor. Based on the various audio signal processing algorithms with various modified processing parameters, e.g., to focus within a portion 207B of the sonar data 202B within which the objects 205B are expected to be detected, the sonar data 202B may be processed to detect one or more objects 205B within the sonar data 202B. As illustrated, the one or more objects 205B may now be detected as a person who is standing within the left portion of the sonar data 202B, which may increase, confirm, validate, and/or verify the detection hypothesis and/or the confidence level associated with the detected objects 205A associated with the infrared imaging data 202A and the detected objects 205B associated with the sonar data 202B.

In example embodiments, the objects 205A detected within the infrared imaging data 202A may now be associated with a high confidence level, e.g., above a confidence threshold, and the objects 205B detected within the sonar data 202B may also be associated with a high confidence level, e.g., above a confidence threshold. The detected objects 205A, 205B may be provided to an active sensor fusion algorithm or process as respective detection hypotheses. In addition, respective confidence levels associated with the detected objects 205A, 205B, as well as infrared imaging data 202A, sonar data 202B, data associated with the infrared imaging sensor, data associated with the sonar sensor, data associated with the image processing algorithms, data associated with the audio signal processing algorithms, and/or any other data, may also be included as part of the respective detection hypotheses. Based on an analysis of the detection hypotheses associated with the infrared imaging data 202A and sonar data 202B and detected objects 205A, 205B, the active sensor fusion algorithm may determine that objects 205A, 205B, e.g., a person detected within each of the infrared imaging data 202A and the sonar data 202B, are detected with a high confidence level, e.g., above a confidence threshold. In example embodiments, based on a convergence of the detection hypotheses and/or confidence levels associated with the detection hypotheses, the active sensor fusion algorithm may determine that an object is detected at a particular location, as detected by each of the infrared imaging sensor and the sonar sensor and associated detection algorithms in this example.

FIGS. 1A-2C illustrate example embodiments of active sensor fusion systems and processes. In other example embodiments, various other types of sensors may be used, including but not limited to optical imaging sensors, infrared imaging sensors, depth sensors, LIDAR (light detection and ranging) sensors, radar (radio detection and ranging) sensors, sonar (sound navigation ranging) sensors, range determination sensors, contact, pressure, or force sensors, and/or other types of sensors. In further example embodiments, various numbers, combinations, and/or arrangements of sensors may be used, including but not limited to any plurality of sensors, e.g., two, three, or more sensors.

In addition, although FIGS. 1A-2C describe example embodiments in which detection hypotheses may have associated confidence levels that may be compared with one or more confidence thresholds, in other example embodiments, detection hypotheses may not be associated with any confidence levels, and the determinations related to objects detected by a plurality of sensors may be output or provided by an active sensor fusion system without reliance on or reference to any confidence levels. For example, the active sensor fusion systems and methods may operate in a continuous, or substantially continuous, manner in which determinations related to objects detected by a plurality of sensors are continuously output or provided by an active sensor fusion system, e.g., after every iteration, or after a defined number of iterations. Alternatively, the determinations related to objects detected by a plurality of sensors may be output or provided by an active sensor fusion system based on a duration of time or a number of iterations, e.g., as measured from the last output, from initiation of the process, or from any other checkpoint. Still further, the determinations related to objects detected by a plurality of sensors may be output or provided by an active sensor fusion system upon request or as needed, e.g., when requested by a vehicle, machine, equipment, robot, or other system.

Further, although FIGS. 1A-2C describe example embodiments in which detection hypotheses may be improved, confirmed, validated, and/or verified by detecting objects with increasing confidence levels, in other example embodiments, the detection hypotheses may confirm, validate, and/or verify that no or zero objects are detected with increasing confidence levels. For example, a LIDAR sensor may initially be associated with a detection hypothesis in which an object is detected with an associated confidence level. However, responsive to receiving one or more detection hypotheses from one or more other sensors, e.g., imaging, infrared, radar, or other sensors, in which no objects are detected with associated confidence levels, and responsive to modifying one or more parameters of the LIDAR sensor and/or LIDAR processing algorithms based on the received detection hypotheses, the LIDAR sensor may then be associated with a subsequent detection hypothesis in which no object is detected with an associated confidence level.

Moreover, the active sensor fusion systems and methods may output or provide determinations related to objects detected by a plurality of sensors and associated detection algorithms using various methods. For example, in example embodiments, to maintain maximum safety of systems operating on the basis of objects detected by the active sensor fusion systems and methods, any object identified in any detection hypothesis associated with any sensor may be determined to be present, and systems may be required modify their operation based on such determinations. This method may effectively comprise a union, as described in set theory, of all detection hypotheses and associated detected objects. Alternatively, the active sensor fusion systems and methods may operate based on an intersection, as described in set theory, of all detection hypotheses and associated detected objects, although this may provide less than maximum safety of systems operating on the basis of detected objects.

In other example embodiments, the active sensor fusion systems and methods may utilize a minimum confidence threshold to make determinations related to detected objects, and effectively filter out or ignore detected objects from detection hypotheses that do not meet or exceed the minimum confidence threshold. In further example embodiments, the active sensor fusion systems and methods may make determinations related to convergence of detection hypotheses and/or convergence of confidence levels, e.g., within a threshold range, and/or above one or more confidence thresholds, in order to make determinations related to detected objects. Various other methods may also be used to make determinations related to objects detected by a plurality of sensors and associated detection algorithms that may be included within respective detection hypotheses. Further, any of the various methods described herein may be combined in various combinations.

In still other example embodiments, the active sensor fusion systems and methods may be able to determine whether a sensor of interest is operating or functioning properly. For example, if a majority, a plurality, or all other sensors detect an object, but the sensor of interest does not detect the same object, potentially even after modifying one or more parameters associated with the sensor of interest, all other sensors, and/or associated detection algorithms, the sensor of interest may be determined to not be functioning properly. Likewise, if a majority, a plurality, or all other sensors do not detect an object, but the sensor of interest detects an object, potentially even after modifying one or more parameters associated with the sensor of interest, all other sensors, and/or associated detection algorithms, the sensor of interest may be determined to not be functioning properly.

Figure 3:
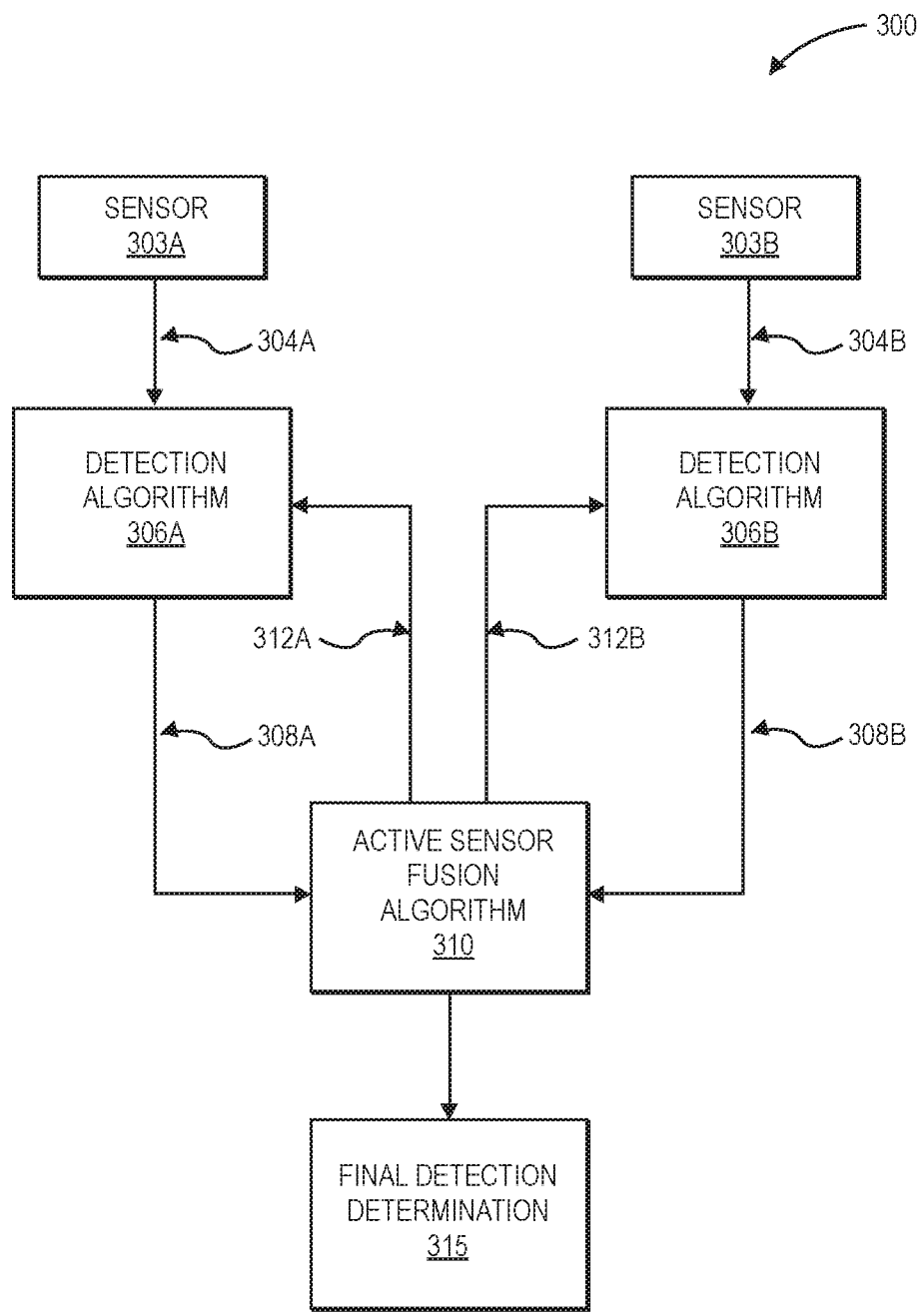
FIG. 3 is a block diagram of an example active sensor fusion system, in accordance with disclosed implementations.

FIG. 3 is a block diagram of an example active sensor fusion system 300, in accordance with disclosed implementations.

As shown in FIG. 3, an active sensor fusion system may include a plurality of sensors, such as a first sensor 303A and a second sensor 303B. Each of the plurality of sensors may receive, capture, or obtain sensor data related to one or more objects within an environment of the sensors. In addition, each of the plurality of sensors may have respective fields of view, e.g., a portion of the environment with respect to which a sensor may receive, capture, or obtain sensor data related to one or more objects. A field of view of a sensor may have various sizes, shapes, lengths, widths, depths, and/or dimensions and may be modified or adjusted, and in some example embodiments, a sensor may have a substantially 360 degree field of view, e.g., using optics, mirrors, gimbals, rotating or swiveling components, actuators, and/or other components to provide a substantially 360 degree field of view. Further, based on respective position and/or orientation data associated with the plurality of sensors having respective fields of view, it may be determined whether and to what extent the respective fields of view of two or more of the plurality of sensors overlap, to aid the detection of the same or common objects by two or more of the plurality of sensors.

In addition, each of the plurality of sensors may comprise various types of sensors, such as optical imaging sensors, infrared imaging sensors, depth sensors, LIDAR sensors, radar sensors, sonar sensors, range determination sensors, contact, pressure, or force sensors, and/or other types of sensors. For example, the first sensor 303A may be an optical imaging sensor, and the second sensor 303B may be an infrared imaging sensor. In addition, the first sensor 303A may be a radar sensor, and the second sensor 303B may be a sonar sensor. Further, the first sensor 303A may be an optical imaging sensor, and the second sensor 303B may be a LIDAR sensor. In example embodiments, contact, pressure, or force sensors may comprise various digital or analog sensors that may receive sensor data related to presence or absence of contact, and/or levels or amounts of pressure or force exerted by such contact. Various other combinations of two or more sensors may also be included in the example active sensor fusion system.

Each of the various types of sensors may have various types of failure modes, in which sensor data received by a sensor is not able to be processed to detect one or more objects. For example, optical imaging sensors may not accurately or reliably detect one or more objects due to underexposure, overexposure, glare, reflections, occlusions or blocking, lack of focus, weather, precipitation, other environmental effects, or various other aspects related to optical imaging sensors and received sensor data. In addition, infrared imaging sensors may not accurately or reliably detect one or more objects due to underexposure, overexposure, reflections, occlusions or blocking, weather, temperature, lack of temperature differences, precipitation, other environmental effects, or various other aspects related to infrared imaging sensors and received sensor data.

Further, depth sensors or range determination sensors may not accurately or reliably detect one or more objects due to reflections, occlusions or blocking, lack of focus, weather, precipitation, other environmental effects, or various other aspects related to depth sensors or range determination sensors and received sensor data. In addition, LIDAR sensors may not accurately or reliably detect one or more objects due to reflections, scattering, absorption, occlusions or blocking, weather, precipitation, particulates, such as smoke, dirt, sand, and/or moisture, other environmental effects, or various other aspects related to LIDAR sensors and received sensor data. As one example, LIDAR sensors may not accurately or reliably detect glass, plastic, windows, or other transparent or translucent objects through which laser light may pass without being reflected back. Also, radar sensors may not accurately or reliably detect one or more objects due to reflections, scattering, absorption, occlusions or blocking, weather, precipitation, particulates, such as smoke, dirt, sand, and/or moisture, other environmental effects, or various other aspects related to radar sensors and received sensor data. Further, sonar sensors may not accurately or reliably detect one or more objects due to reflections, scattering, absorption, occlusions or blocking, weather, precipitation, particulates, such as smoke, dirt, sand, and/or moisture, other environmental effects, or various other aspects related to sonar sensors and received sensor data. As one example, sonar sensors may not accurately or reliably detect materials that scatter or absorb audio signals, such as grass, hair, fur, or other uneven materials, textures, or surfaces.

Moreover, each of the various types of sensors may have various types of failure modes other than those described herein, and each of the various types of sensors may also fail to operate or function properly for various other reasons, such as power connection failures, data or communication connection failures, mechanical failures, electrical failures, failures related to components or portions of sensors, or various other types of failures.

Furthermore, each of the various types of sensors may be considered complementary with one or more other types of sensors. For example, complementary sensors may comprise two or more sensors that receive sensor data using substantially different media, such as optical or visible light, infrared light, laser light, radiofrequency signals, audio signals, or various other types of different media. In addition, complementary sensors may comprise two or more sensors that have substantially different failure modes, such as underexposure or overexposure of light, lack of temperature differences with respect to infrared light, absorption of audio signals, scattering of radiofrequency signals, scattering of laser light, or various other types of different failure modes. Further, complementary sensors may comprise various combinations of two or more sensors, in which the proper operation or functioning of one sensor may be substantially independent of the proper operation or functioning of another sensor.

Continuing with FIG. 3, each of the plurality of sensors, e.g., sensors 303A, 303B, may receive sensor data 304 and provide the sensor data, e.g., first sensor data 304A and second sensor data 304B, to respective detection algorithms, e.g., first detection algorithm 306A and second detection algorithm 306B. Each of the detection algorithms may receive and process sensor data from one or more sensors, and various detection algorithms may be utilized for various types of sensor data.

For example, for optical imaging data, the various detection algorithms may include image processing, position detection, orientation detection, line detection, edge detection, surface detection, object detection, feature detection, or various other types of image processing algorithms to detect one or more objects within the imaging data. In addition, for infrared imaging data, the various detection algorithms may include image processing, infrared image processing, thermography, position detection, orientation detection, or various other types of image processing algorithms to detect one or more objects within the infrared imaging data.

Further, for depth or ranging data, the various detection algorithms may include depth determination, distance determination, range determination, time of flight, position detection, orientation detection, or various other types of depth or range determination algorithms to detect one or more objects within the depth or ranging data. In addition, for laser light data, the various detection algorithms may include depth determination, distance determination, range determination, direction determination, speed determination, time of flight, position detection, orientation detection, or various other types of algorithms to detect one or more objects within the laser light data. Also, for radar data, the various detection algorithms may include depth determination, distance determination, range determination, direction determination, speed determination, time of flight, position detection, orientation detection, or various other types of algorithms to detect one or more objects within the radar data. Further, for sonar data, the various detection algorithms may include depth determination, distance determination, range determination, direction determination, speed determination, time of flight, position detection, orientation detection, or various other types of algorithms to detect one or more objects within the sonar data.

Moreover, each of the various types of detection algorithms may be considered complementary with one or more other types of detection algorithms. For example, complementary detection algorithms may comprise two or more detection algorithms that receive and process sensor data associated with substantially different media, such as optical or visible light, infrared light, laser light, radiofrequency signals, audio signals, or various other combinations of different media. In addition, complementary detection algorithms may comprise two or more detection algorithms that have substantially different failure modes, such as underexposure or overexposure of light, lack of temperature differences with respect to infrared light, absorption of audio signals, scattering of radiofrequency signals, scattering of laser light, or various other combinations of different failure modes. Further, complementary detection algorithms may comprise various combinations of two or more detection algorithms, in which the proper processing or analysis of sensor data from one sensor may be substantially independent of the proper processing or analysis of sensor data from another sensor.

After processing or analyzing the received sensor data from one or more sensors, each of the plurality of detection algorithms may output or provide respective detection hypotheses, e.g., first detection hypothesis 308A and second detection hypothesis 308B, to the active sensor fusion algorithm 310. Each of the detection hypotheses may include data or information related to one or more objects detected within received sensor data from one or more sensors. In addition, a detection hypothesis may include data related to a position, orientation, distance, range, direction, speed, size, shape, or other properties or aspects related to one or more detected objects. Further, a detection hypothesis may also include one or more confidence levels associated with the one or more detected objects. For example, a low confidence level, e.g., below one or more confidence thresholds, may indicate a relatively low level of certainty with respect to data or information related to one or more detected objects, and a high confidence level, e.g., above one or more confidence thresholds, may indicate a relatively high level of certainty with respect to data or information related to one or more detected objects.

Moreover, a detection hypothesis may also include various other types of data or information. For example, the detection hypothesis may include at least a portion of the received sensor data, such as optical imaging data, infrared imaging data, LIDAR data, radar data, sonar data, or other sensor data. In addition, the detection hypothesis may also include data or information related to one or more operational parameters, as further described herein, associated with a sensor from which the sensor data was received. Further, the detection hypothesis may also include data or information related to one or more processing parameters, as further described herein, associated with a detection algorithm that processed or analyzed the received sensor data.

The active sensor fusion algorithm 310 may process, analyze, compare, and/or combine respective detection hypotheses received from each of the detection algorithms. In some embodiments, the active sensor fusion algorithm 310 may process any object detected as part of any detection hypothesis without regard for any associated confidence levels. For example, the active sensor fusion algorithm 310 may process data or information associated with all detected objects from all detection hypotheses to provide maximum safety, regardless of any associated levels of confidence or certainty with respect to one or more detected objects. In other example embodiments, the active sensor fusion algorithm 310 may process data or information associated with detected objects from respective detection hypotheses having confidence levels that meet or exceed a confidence threshold, e.g., a minimum confidence threshold. This may reduce the computational load on the active sensor fusion algorithm 310 but may also provide a relatively lower level of safety by filtering out one or more detected objects having associated confidence levels below the confidence threshold.

In addition, the active sensor fusion algorithm 310 may process, analyze, compare, and/or combine respective detection hypotheses to generate a union, as described in set theory, of all detected objects from any detection hypotheses, which may also provide increased safety by considering substantially all detected objects. In other example embodiments, the active sensor fusion algorithm 310 may process, analyze, compare, and/or combine respective detection hypotheses to generate an intersection, as described in set theory, of those detected objects that are each included in all of the detection hypotheses, which may focus the analysis on objects that have been detected with higher confidence and/or by each of the sensors but may also provide reduced safety by filtering out one or more objects detected and included in fewer than all detection hypotheses.

In example embodiments, the active sensor fusion algorithm 310 may process, analyze, compare, and/or combine respective detection hypotheses to determine differences between respective detection hypotheses. For example, as described with respect to FIGS. 1A-1C, a detection hypothesis generated by processing the imaging data 102A, as shown in FIG. 1A, may not initially detect a person within the left side of the imaging data 102A. In addition, as described with respect to FIGS. 2A-2C, a detection hypothesis generated by processing the infrared imaging data 202A, as shown in FIG. 2A, may not initially detect a person within the left side of the infrared imaging data 202A, and likewise, a detection hypothesis generated by processing the sonar data 202B, as shown in FIG. 2A, may not initially detect a person within the left side of the sonar data 202B.

After processing, analyzing, comparing, and/or combining the respective detection hypotheses, the active sensor fusion algorithm 310 may output or provide various data or information 312, e.g., first data 312A and second data 312B, related to detection hypotheses to one or more detection algorithms for further sensing and/or processing. In example embodiments, all detection hypotheses received and processed by the active sensor fusion algorithm 310 may be provided to each of the detection algorithms. In other example embodiments, all detection hypotheses received and processed by the active sensor fusion algorithm 310 may be provided to a portion or subset of the detection algorithms, e.g., only those detection algorithms that did not detect all objects processed by the active sensor fusion algorithm 310. In further example embodiments, only a portion or subset of detection hypotheses received and processed by the active sensor fusion algorithm 310 may be provided to one or more of the detection algorithms, e.g., only those detection hypotheses that include data or information having differences from a detection hypothesis associated with a detection algorithm. Moreover, the feeding back of one or more detection hypotheses to one or more detection algorithms may also be based on confidence levels associated with one or more detected objects and/or detection hypotheses.

Further, the data or information 312 that is output or provided to one or more detection algorithms for further sensing and/or processing may also include any of the various data or information received by the active sensor fusion algorithm 310, such as data or information related to sensor data, operational parameters of one or more sensors, and/or processing parameters of one or more detection algorithms.

Moreover, the data or information 312 that is output or provided by the active sensor fusion algorithm 310 to one or more detection algorithms for further sensing and/or processing may also include one or more refinements, modifications, and/or adjustments to one or more operational parameters of one or more sensors. In addition, the data or information 312 may also include one or more refinements, modifications, and/or adjustments to one or more processing parameters of one or more detection algorithms.

In this regard, each of the various types of sensors may have various operational parameters. For example, optical imaging or infrared imaging sensors may have various operational parameters, such as field of view, position, orientation, zoom, focus, focal length, exposure, exposure time, aperture, contrast, brightness, various types of filters, detected optical frequencies or wavelengths, detected infrared frequencies or wavelengths, or various other operational parameters. In addition, contact, pressure, or force sensors may have various operational parameters, such as position, orientation, sensitivity, detected forces or pressures, or various other operational parameters.

Further, LIDAR sensors may have various operational parameters, such as field of view, position, orientation, emitted laser light frequency or wavelength, emitted laser light pulse size, shape, width, duration, or other properties, reflected laser light reception time or duration, reflected laser light pulse size, shape, width, duration, or other properties, or various other operational parameters. Also, radar sensors may have various operational parameters, such as field of view, position, orientation, emitted radiofrequency signal frequency or wavelength, emitted radiofrequency signal size, shape, width, duration, or other properties, reflected radiofrequency signal reception time or duration, reflected radiofrequency signal size, shape, width, duration, or other properties, or various other operational parameters. In addition, sonar sensors may have various operational parameters, such as field of view, position, orientation, emitted audio signal frequency or wavelength, emitted audio signal amplitude, emitted audio signal size, shape, width, duration, or other properties, reflected audio signal reception time or duration, reflected audio signal size, shape, width, duration, or other properties, or various other operational parameters.

Moreover, in addition or alternatively to refinements, modifications, and/or adjustments to one or more operational parameters of one or more sensors, the data or information 312 that is output or provided by the active sensor fusion algorithm 310 to one or more detection algorithms for further sensing and/or processing may also include selections or indications of one or more sensors or types of sensors for further sensing and/or processing. For example, based on the processing and analysis of the detection hypotheses by the active sensor fusion algorithm 310, one or more sensors may be selected for further sensing, e.g., one or more sensors that receive sensor data that may be complementary to sensor data received from other sensors that are associated with detection hypotheses processed by the active sensor fusion algorithm 310. In this manner, in addition or alternatively to refining, modifying, and/or adjusting operational parameters of one or more sensors to improve, confirm, validate, verify, and/or refute detection hypotheses associated with various sensors, one or more sensors or types of sensors may be selected to further improve, confirm, validate, verify, and/or refute detection hypotheses associated with various sensors.

Furthermore, each of the various types of detection algorithms may have various processing parameters. For example, image processing or infrared image processing algorithms may have various processing parameters, such as portion or section of data to be processed, adjustments to exposure, contrast, brightness, or other properties, various types of filters, or various other processing parameters. In addition, contact, force, or pressure processing algorithms may have various processing parameters, such as contact, force, or pressure sensitivity, one or more force or pressure thresholds, or various other processing parameters.

Further, laser light processing algorithms may have various processing parameters, such as portion or section of data to be processed, adjustments to reflected laser light frequency or wavelength, reflected laser light saturation, various types of filters applied to reflected laser light, or various other processing parameters. Also, radiofrequency signal processing algorithms may have various processing parameters, such as portion or section of data to be processed, adjustments to reflected radiofrequency signal frequency or wavelength, reflected radiofrequency signal saturation, various types of filters applied to reflected radiofrequency signals, or various other processing parameters. In addition, audio signal processing algorithms may have various processing parameters, such as portion or section of data to be processed, adjustments to reflected audio signal frequency or wavelength, reflected audio signal saturation, various types of filters applied to reflected audio signals, or various other processing parameters.

Moreover, in addition or alternatively to refinements, modifications, and/or adjustments to one or more processing parameters of one or more detection algorithms, the data or information 312 that is output or provided by the active sensor fusion algorithm 310 to one or more detection algorithms for further sensing and/or processing may also include selections or indications of one or more detection algorithms or types of detection algorithms for further sensing and/or processing. For example, based on the processing and analysis of the detection hypotheses by the active sensor fusion algorithm 310, one or more detection algorithms may be selected for further processing, e.g., one or more detection algorithms to process sensor data that may be complementary to processing of sensor data by other detection algorithms that are associated with detection hypotheses processed by the active sensor fusion algorithm 310. In this manner, in addition or alternatively to refining, modifying, and/or adjusting processing parameters of one or more detection algorithms to improve, confirm, validate, verify, and/or refute detection hypotheses associated with various detection algorithms, one or more detection algorithms or types of detection algorithms may be selected to further improve, confirm, validate, verify, and/or refute detection hypotheses associated with various detection algorithms.

Based on the received data or information 312, which may include one or more detection hypotheses, one or more sensor data, data or information related to one or more sensors, data or information related to one or more detection algorithms, data or information related to refinements, modifications, and/or adjustments to one or more operational parameters of one or more sensors, data or information related to refinements, modifications, and/or adjustments to one or more processing parameters of one or more detection algorithms, data or information related to selections of one or more sensors, data or information related to selections of one or more detection algorithms, and/or any other data, the respective detection algorithms 306A, 306B may refine, modify, and/or adjust one or more processing parameters thereof, and/or one or more operational parameters of respective sensors may also be refined, modified, and/or adjusted. Further, one or more sensors may be selected for further sensing, and/or one or more detection algorithms may also be selected for further processing of sensor data.

In this manner, by feeding back various data or information by the active sensor fusion algorithm 310 to one or more detection algorithms 306 and associated sensors 303, the one or more detection algorithms 306 and/or associated sensors 303 may be refined, modified, and/or adjusted to more accurately and reliably detect one or more objects within an environment.

For example, as described with respect to FIGS. 1A-1C, after modifying one or more operational parameters of an imaging sensor and/or modifying one or more processing parameters of an image processing algorithm, a subsequent detection hypothesis generated by processing the imaging data 102A, as shown in FIG. 1C, may now detect a person within the left side of the imaging data 102A. In the example embodiments of FIGS. 1B and 1C, the image processing algorithm may be modified with one or more processing parameters to focus the image processing on a portion or section of the data, e.g., a left side of imaging data 102A, and to apply one or more filters to the imaging data 102A, and/or one or more operational parameters of the imaging sensor may be modified, e.g., by adjusting a focus, exposure, contrast, brightness, filters, or various other properties associated with the imaging sensor.

In addition, as described with respect to FIGS. 2A-2C, after modifying one or more operational parameters of an infrared imaging sensor and/or modifying one or more processing parameters of an infrared image processing algorithm, a subsequent detection hypothesis generated by processing the infrared imaging data 202A, as shown in FIG. 2C, may now detect a person within the left side of the infrared imaging data 202A. In the example embodiments of FIGS. 2B and 2C, the infrared image processing algorithm may be modified with one or more processing parameters to focus the infrared image processing on a portion or section of the data, e.g., a left side of infrared imaging data 202A, and to apply one or more filters to the infrared imaging data 202A, and/or one or more operational parameters of the infrared imaging sensor may be modified, e.g., by adjusting a focus, exposure, contrast, filters, or various other properties associated with the infrared imaging sensor.

Likewise, after modifying one or more operational parameters of a sonar sensor and/or modifying one or more processing parameters of an audio signal processing algorithm, a subsequent detection hypothesis generated by processing the sonar data 202B, as shown in FIG. 2C, may now detect a person within the left side of the sonar data 202B. In the example embodiments of FIGS. 2B and 2C, the audio signal processing algorithm may be modified with one or more processing parameters to focus the audio signal image processing on a portion or section of the data, e.g., a left side of sonar data 202B, and to apply one or more filters to the sonar data 202B, and/or one or more operational parameters of the sonar sensor may be modified, e.g., by adjusting a field of view, position, orientation, audio signal frequency, audio signal amplitude, or various other properties associated with the sonar sensor.

The respective detection hypotheses generated based on one or more refinements, modifications, and/or adjustments to one or more operational parameters of sensors and/or one or more processing parameters of detection algorithms may then be provided or output to the active sensor fusion algorithm 310. The active sensor fusion algorithm 310 may again process, analyze, compare, and/or combine respective detection hypotheses as described herein. The processes, operations, and functions described herein with respect to the sensors 303, detection algorithms 306, and the active sensor fusion algorithm 310 may iterate or repeat any number of times, e.g., one, two, or other number of iterations, continuously, upon request or as instructed, as needed to reach a final detection determination 315, or any other duration of time or number of iterations.

Various methods may be utilized by the active sensor fusion algorithm 310 to provide a final detection determination 315 based on any number of iterations of the processes described herein. In some example embodiments, the active sensor fusion algorithm 310 may output or provide a final detection determination 315 upon processing detection hypotheses and feeding back detection hypotheses for a defined amount of time, e.g., one second, two seconds, or any other amount of time, and/or for a defined number of iterations, e.g., five iterations, ten iterations, one hundred iterations, or any other number of iterations.

In other example embodiments, the active sensor fusion algorithm 310 may output or provide a final detection determination 315 upon respective detection hypotheses converging and/or upon respective confidence levels associated with detection hypotheses converging. For example, upon respective detection hypotheses converging such that each of the detection hypotheses includes the same one or more detected objects, or each includes zero detected objects, the active sensor fusion algorithm 310 may output a final detection determination 315 related to the convergence of detected objects. In addition, upon respective confidence levels associated with detection hypotheses converging, in which the detection hypotheses themselves have also converged, to within a threshold or range of other respective confidence levels associated with other detection hypotheses, the active sensor fusion algorithm 310 may also output a final detection determination 315 related to the convergence of detected objects.

In still other example embodiments, the active sensor fusion algorithm 310 may output or provide a final detection determination 315 substantially continuously or periodically, e.g., after each iteration, periodically after a defined number of iterations, periodically after a defined time interval, or at any other periodic or continuous intervals.

The final detection determination 315 may include various data or information related to one or more detected objects, as well as position, orientation, distance, range, direction, speed, size, shape, or other properties or aspects related to one or more detected objects. In addition, as described herein with respect to detection hypotheses, the final detection determination 315 may also include various other data or information, such as sensor data from various sensors, detection hypotheses associated with various detection algorithms, confidence levels associated with various detection hypotheses, data or information related to one or more sensors, data or information related to one or more detection algorithms, data or information related to refinements, modifications, and/or adjustments to one or more operational parameters of one or more sensors, data or information related to refinements, modifications, and/or adjustments to one or more processing parameters of one or more detection algorithms, data or information related to selections of one or more sensors, data or information related to selections of one or more detection algorithms, and/or any other data.

As described herein, by receiving and processing detection hypotheses from a plurality of sensors and detection algorithms, and then by feeding back detection hypotheses and various other data to one or more of the plurality of sensors and detection algorithms, along with various refinements, modifications, and/or adjustments to one or more operational parameters of sensors and/or processing parameters of detection algorithms, the active sensor fusion systems and methods described herein may more accurately and reliably make final detection determinations with respect to one or more detected objects within an environment. In addition to processing, analyzing, comparing, and/or combining various detection hypotheses, the active sensor fusion systems and methods described herein may direct, instruct, or command various refinements, modifications, and/or adjustments to elements of the systems to more accurately and reliably detect one or more objects using various types of sensors and/or various detection algorithms, based at least in part on previously received and processed data or information related to detected objects, sensors, and/or detection algorithms.

Based on the final detection determination 315 output or provided by the active sensor fusion algorithm, one or more systems may modify or adjust their operations to account for detected objects included within the final detection determination 315. For example, various types of vehicles, such as aerial, ground-based, water-based, autonomous, semi-autonomous, or others, may receive and process the final detection determination 315 and modify their operations relative to the detected objects, e.g., to avoid detected objects, to maneuver around, in proximity to, or in contact with detected objects, to contact, obtain, acquire, transport, or release detected objects, or various other operations. In addition, various types of machinery, equipment, devices, or other systems, such as manufacturing equipment, storage systems, supply chain logistics systems, security and safety systems, control systems, or other systems utilizing object detection, may receive and process the final detection determination 315 and modify their operations relative to the detected objects, e.g., to pick up detected objects, to manipulate detected objects, to modify detected objects, to release detected objects, to avoid detected objects, to maneuver around, in proximity to, or in contact with detected objects, or various other operations.

Further, in some example embodiments, one or more components or elements of the active sensor fusion systems described herein may be incorporated into other systems, e.g., vehicles, machines, equipment, or other systems, that may utilize and operate at least partially based on the final detection determination. In other example embodiments, one or more components or elements of the active sensor fusion systems described herein may be separate from and/or external to other systems, e.g., vehicles, machines, equipment, or other systems, that may utilize and operate at least partially based on the final detection determination, and such separate or external components or elements of the active sensor fusion systems may maintain communication capabilities with one or more components of such vehicles, machines, equipment, or other systems, e.g., at least to provide the final detection determination to such other systems.

Figure 4:
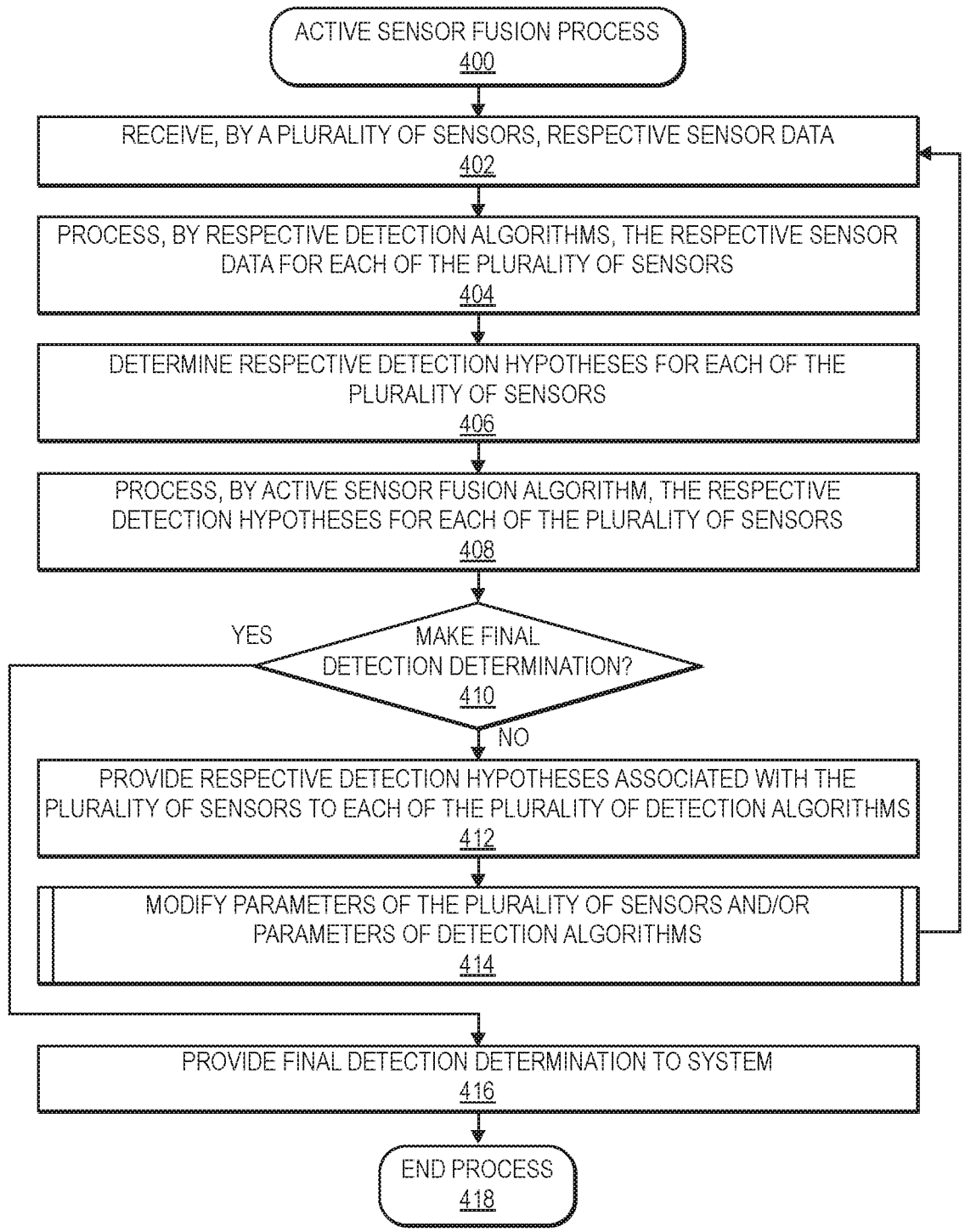
FIG. 4 is a flow diagram illustrating an example active sensor fusion process, in accordance with disclosed implementations.

FIG. 4 is a flow diagram illustrating an example active sensor fusion process 400, in accordance with disclosed implementations.

The process 400 may begin by receiving, by a plurality of sensors, respective sensor data, as at 402. For example, an imaging sensor may receive imaging data of the environment within a field of view. In addition, a radar sensor may receive radiofrequency signals that are reflected back from the environment within a field of view. Various other types of sensors may receive various other types of sensor data.

The process 400 may continue by processing, by respective detection algorithms, the respective sensor data for each of the plurality of sensors, as at 404. For example, an image processing algorithm may process the imaging data from an imaging sensor. In addition, a radiofrequency signal processing algorithm may process the reflected radiofrequency signals from the radar sensor. Various other types of detection algorithms may process various other types of sensor data.

The process 400 may proceed by determining respective detection hypotheses for each of the plurality of sensors, as at 406. For example, a detection hypothesis may include data associated with one or more detected objects. In addition, a detection hypothesis may also include sensor data, data related to operational parameters of the sensor, and/or data related to processing parameters of the detection algorithm. Various other types of data may also be included in the detection hypotheses.

The process 400 may then continue to process, by an active sensor fusion algorithm, the respective detection hypotheses for each of the plurality of sensors, as at 408. For example, the active sensor fusion algorithm may process, analyze, compare, and/or combine the respective detection hypotheses using various methods, as described herein. In addition, the active sensor fusion algorithm may make a final detection determination based on the respective detection hypotheses using various methods, as described herein.

The process 400 may then proceed to determine whether a final detection determination is to be made, as at 410. For example, a final detection determination may be made using various methods, as described herein, such as based on a duration of time, number of iterations, confidence levels, and/or other aspects.

If a final detection determination is not to be made, then the process 400 continues to provide respective detection hypotheses associated with the plurality of sensors to each of the plurality of detection algorithms, as at 412. For example, the respective detection hypotheses may be provided to one or more detection algorithms and associated sensors using various methods, as described herein, e.g., a detection algorithm may receive detection hypotheses associated with each of the other detection algorithms and associated sensors, a detection algorithm may receive detection hypotheses associated with other detection algorithms and associated sensors that include differences related detected objects, or others.

Figure 5:
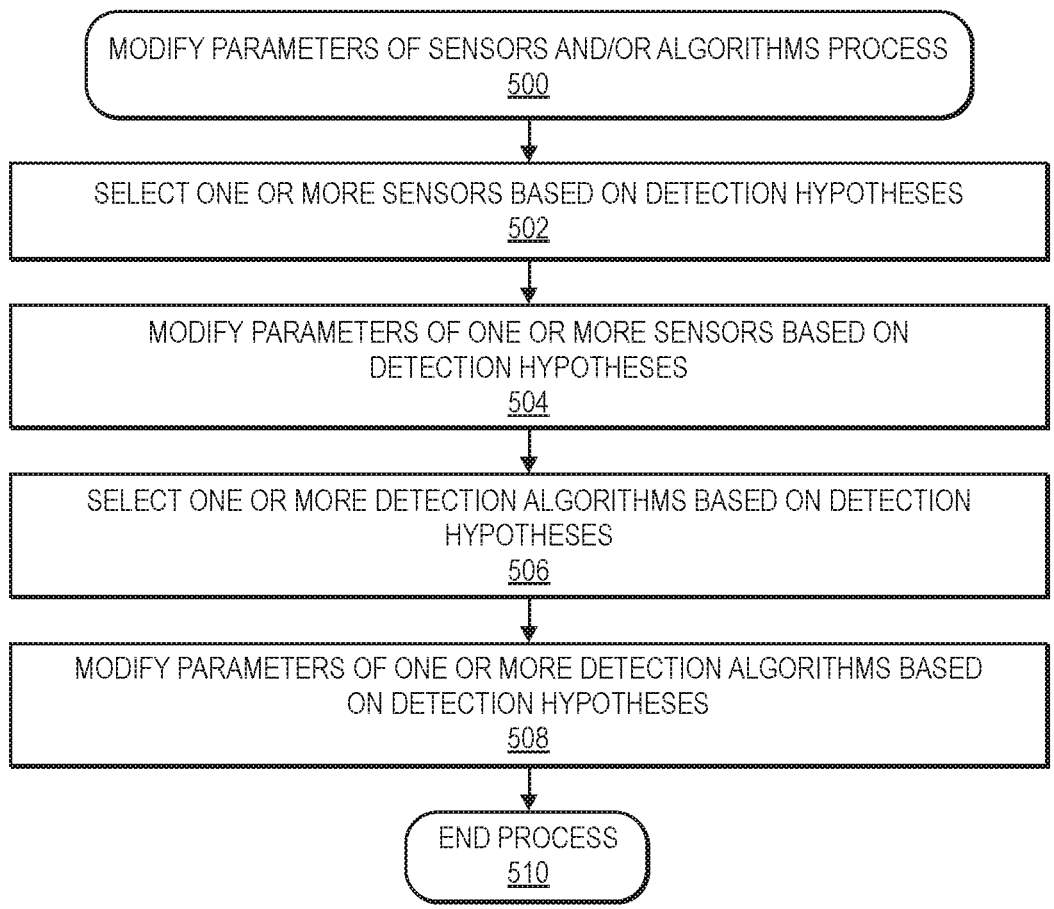
FIG. 5 is a flow diagram illustrating an example modify parameters process for active sensor fusion, in accordance with disclosed implementations.

The process 400 may then proceed with modifying parameters of the plurality of sensors and/or parameters of detection algorithms, as at 414, which is described in further detail with respect to FIG. 5. For example, one or more operational parameters of one or more sensors may be refined, modified, and/or adjusted. In addition, one or more processing parameters of one or more detection algorithms may be refined, modified, and/or adjusted. Further, one or more sensors of particular types and/or one or more detection algorithms of particular types may be selected for further sensing and/or processing to detect objects within an environment.

The process 400 may then return to step 402 to receive and process sensor data, determine detection hypotheses, and process the detection hypotheses by the active sensor fusion algorithm, based at least in part on the one or more refinements, modifications, and/or adjustments to one or more sensors and/or detection algorithms.

Returning to step 410, if a final detection determination is to be made at 410, then the process 400 continues to provide the final detection determination to a system, as at 416. For example, various types of vehicles, machinery, equipment, or other systems may receive the final detection determination and modify their operations at least partially based on detected objects included in the final detection determination, as described herein. The process 400 may then end, as at 418.

FIG. 5 is a flow diagram illustrating an example modify parameters process for active sensor fusion 500, in accordance with disclosed implementations. Although FIG. 5 illustrates a sequential process having several steps, any one or more of the steps illustrated in FIG. 5 may be skipped or omitted. In some example embodiments, the modification of parameters of sensors and/or algorithms may involve only one of the steps illustrated in FIG. 5.

The process 500 may begin with selecting one or more sensors based on detection hypotheses, as at 502. For example, based on processing and analysis of detection hypotheses by an active sensor fusion algorithm, the active sensor fusion algorithm may select, determine, or indicate one or more sensors or types of sensors for further sensing to accurately and reliably detect objects within an environment. In some examples, based on detection hypotheses received from associated sensors that have been processed by the active sensor fusion algorithm, one or more complementary sensors may be selected or determined for further sensing, e.g., in order to more accurately and reliably detect objects using a plurality of sensors, including complementary sensors.

The process 500 may proceed with modifying parameters of one or more sensors based on detection hypotheses, as at 504. For example, based on processing and analysis of detection hypotheses by an active sensor fusion algorithm, the active sensor fusion algorithm may direct, instruct, or command refinement, modification, and/or adjustment to one or more operational parameters associated with one or more sensors for further sensing to accurately and reliably detect objects within an environment.

The process 500 may continue with selecting one or more detection algorithms based on detection hypotheses, as at 506. For example, based on processing and analysis of detection hypotheses by an active sensor fusion algorithm, the active sensor fusion algorithm may select, determine, or indicate one or more detection algorithms or types of detection algorithms for further processing to accurately and reliably detect objects within an environment. In some examples, based on detection hypotheses received from associated sensors that have been processed by the active sensor fusion algorithm, one or more complementary detection algorithms may be selected or determined for further processing, e.g., in order to more accurately and reliably detect objects using a plurality of detection algorithms, including complementary detection algorithms.

The process 500 may proceed with modifying parameters of one or more detection algorithms based on detection hypotheses, as at 508. For example, based on processing and analysis of detection hypotheses by an active sensor fusion algorithm, the active sensor fusion algorithm may direct, instruct, or command refinement, modification, and/or adjustment to one or more processing parameters associated with one or more detection algorithms for further processing to accurately and reliably detect objects within an environment.

The process 500 may then end, as at 510.

Figure 6:
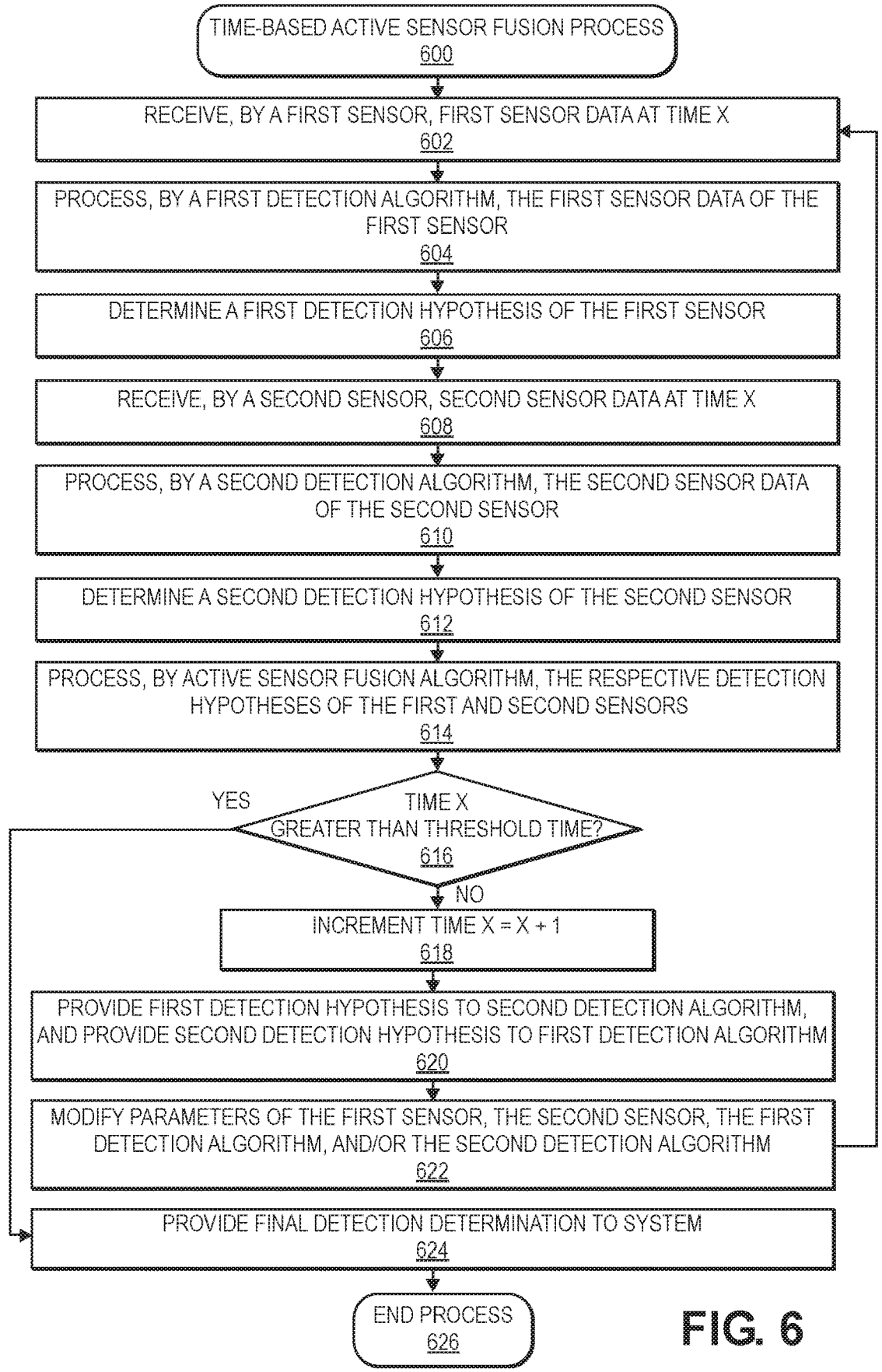
FIG. 6 is a flow diagram illustrating an example time-based active sensor fusion process, in accordance with disclosed implementations.

FIG. 6 is a flow diagram illustrating an example time-based active sensor fusion process 600, in accordance with disclosed implementations.

The process 600 may begin by receiving, by a first sensor, first sensor data at time X, as at 602. For example, a LIDAR sensor may receive laser light that is reflected back from the environment within a field of view. Various other types of sensors may receive various other types of sensor data.

The process 600 may continue by processing, by a first detection algorithm, the first sensor data of the first sensor, as at 604. For example, a laser light processing algorithm may process the reflected laser light from the LIDAR sensor. Various other types of detection algorithms may process various other types of sensor data.

The process 600 may proceed by determining a first detection hypothesis of the first sensor, as at 606. For example, a detection hypothesis may include data associated with one or more detected objects. In addition, a detection hypothesis may also include sensor data, data related to operational parameters of the sensor, and/or data related to processing parameters of the detection algorithm. Various other types of data may also be included in the detection hypothesis.

The process 600 may continue by receiving, by a second sensor, second sensor data at time X, as at 608. For example, a sonar sensor may receive audio signals that are reflected back from the environment within a field of view. Various other types of sensors may receive various other types of sensor data.

The process 600 may proceed by processing, by a second detection algorithm, the second sensor data of the second sensor, as at 610. For example, an audio signal processing algorithm may process the reflected audio signals from the sonar sensor. Various other types of detection algorithms may process various other types of sensor data.

The process 600 may continue by determining a second detection hypothesis of the second sensor, as at 612. For example, a detection hypothesis may include data associated with one or more detected objects. In addition, a detection hypothesis may also include sensor data, data related to operational parameters of the sensor, and/or data related to processing parameters of the detection algorithm. Various other types of data may also be included in the detection hypothesis.

The process 600 may then continue to process, by an active sensor fusion algorithm, the respective detection hypotheses of the first and second sensors, as at 614. For example, the active sensor fusion algorithm may process, analyze, compare, and/or combine the respective detection hypotheses using various methods, as described herein.

The process 600 may then proceed to determine whether time X is greater than a threshold time, as at 616. For example, the process 600 may be configured to operate for a defined duration of time or a defined number of iterations before the active sensor fusion algorithm outputs a final detection determination, as described herein. If the time X is not greater than the threshold time, then the process 600 may proceed to increment the time X to equal X+1, as at 618.

Then, the process 600 continues to provide the first detection hypothesis to the second detection algorithm, and to provide the second detection hypothesis to the first detection algorithm, as at 620. For example, the first and second detection hypotheses may be provided to the second and first detection algorithms, respectively, using various methods, as described herein, e.g., a detection algorithm may receive all other detection hypotheses, a detection algorithm may receive a detection hypothesis associated with the other detection algorithm that includes differences related detected objects, or other methods.

The process 600 may then proceed with modifying parameters of the first sensor, the second sensor, the first detection algorithm, and/or the second detection algorithm, as at 622, which is described in further detail with respect to FIG. 5. For example, one or more operational parameters of the first and/or second sensors may be refined, modified, and/or adjusted. In addition, one or more processing parameters of the first and/or second detection algorithms may be refined, modified, and/or adjusted. Further, one or more sensors and/or one or more detection algorithms may be selected for further sensing and/or processing to detect objects within an environment.

The process 600 may then return to step 602 to receive and process sensor data, determine detection hypotheses, and process the detection hypotheses by the active sensor fusion algorithm, based at least in part on the one or more refinements, modifications, and/or adjustments to one or more sensors and/or detection algorithms.

Returning to step 616, if the time X is greater than the threshold time, then the process 600 continues to provide the final detection determination to a system, as at 624. For example, various types of vehicles, machinery, equipment, or other systems may receive the final detection determination and modify their operations at least partially based on detected objects included in the final detection determination, as described herein. The process 600 may then end, as at 626.

Figure 7:
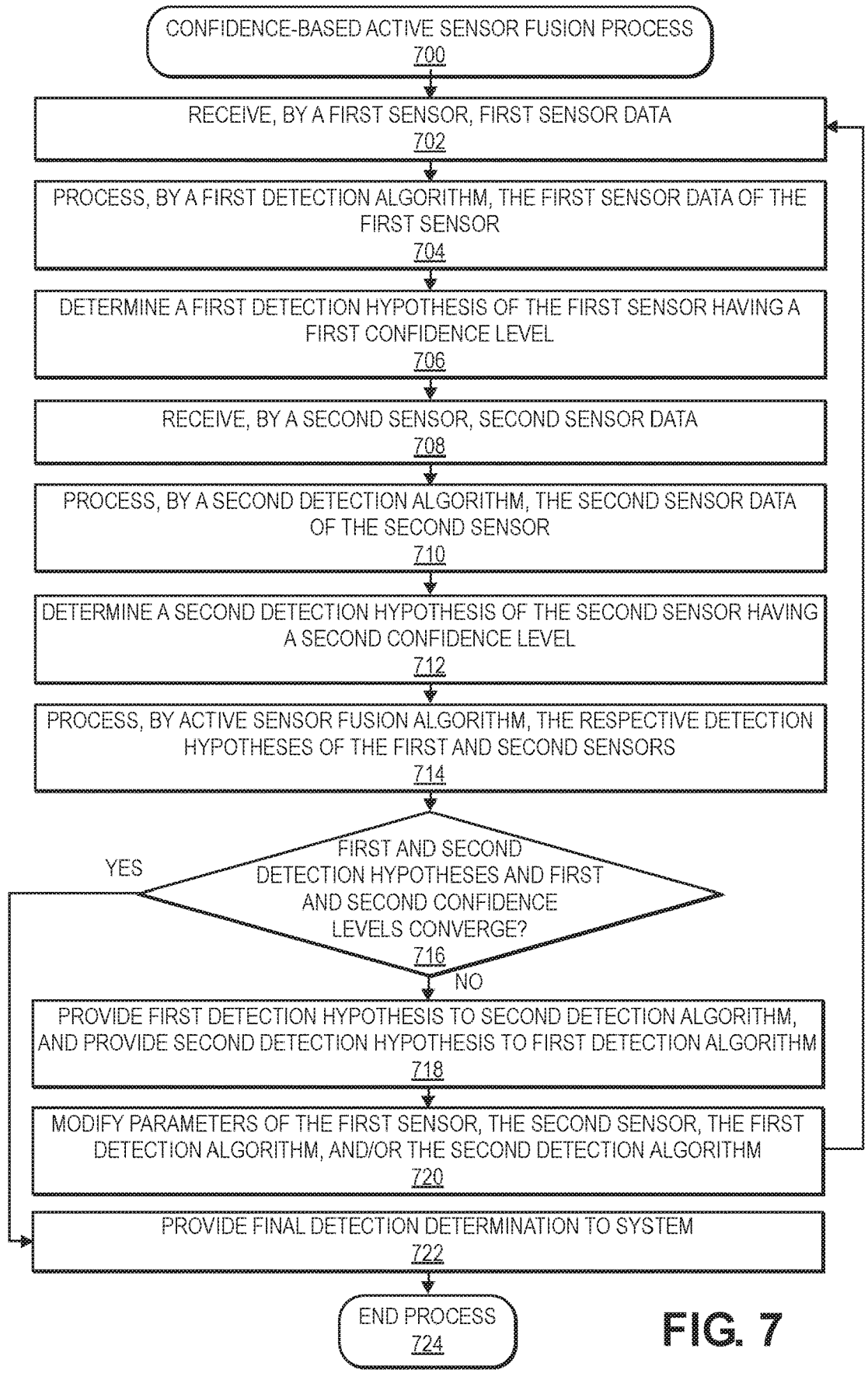
FIG. 7 is a flow diagram illustrating an example confidence-based active sensor fusion process, in accordance with disclosed implementations.

FIG. 7 is a flow diagram illustrating an example confidence-based active sensor fusion process 700, in accordance with disclosed implementations.

The process 700 may begin by receiving, by a first sensor, first sensor data, as at 702. For example, a LIDAR sensor may receive laser light that is reflected back from the environment within a field of view. Various other types of sensors may receive various other types of sensor data.

The process 700 may continue by processing, by a first detection algorithm, the first sensor data of the first sensor, as at 704. For example, a laser light processing algorithm may process the reflected laser light from the LIDAR sensor. Various other types of detection algorithms may process various other types of sensor data.

The process 700 may proceed by determining a first detection hypothesis of the first sensor having a first confidence level, as at 706. For example, a detection hypothesis may include data associated with one or more detected objects. In addition, a detection hypothesis may also include sensor data, data related to operational parameters of the sensor, and/or data related to processing parameters of the detection algorithm. Further, a detection hypothesis may also include a confidence level associated with a relative level of certainty with which one or more objects are detected within an environment. Various other types of data may also be included in the detection hypothesis.

The process 700 may continue by receiving, by a second sensor, second sensor data, as at 708. For example, a radar sensor may receive radiofrequency signals that are reflected back from the environment within a field of view. Various other types of sensors may receive various other types of sensor data.

The process 700 may proceed by processing, by a second detection algorithm, the second sensor data of the second sensor, as at 710. For example, a radiofrequency signal processing algorithm may process the reflected radiofrequency signals from the radar sensor. Various other types of detection algorithms may process various other types of sensor data.

The process 700 may continue by determining a second detection hypothesis of the second sensor having a second confidence level, as at 712. For example, a detection hypothesis may include data associated with one or more detected objects. In addition, a detection hypothesis may also include sensor data, data related to operational parameters of the sensor, and/or data related to processing parameters of the detection algorithm. Further, a detection hypothesis may also include a confidence level associated with a relative level of certainty with which one or more objects are detected within an environment. Various other types of data may also be included in the detection hypothesis.

The process 700 may then continue to process, by an active sensor fusion algorithm, the respective detection hypotheses of the first and second sensors, as at 714. For example, the active sensor fusion algorithm may process, analyze, compare, and/or combine the respective detection hypotheses using various methods, as described herein.

The process 700 may then proceed to determine whether the first and second detection hypotheses and/or the first and second confidence levels converge, as at 716. For example, the process 700 may be configured to operate or iterate until the detection hypotheses converge, e.g., the first and second detection hypotheses each includes the same objects or each includes no objects, and/or until confidence levels associated with the detection hypotheses converge, e.g., the first confidence level is within a threshold or range of the second confidence level, assuming convergence of the detected objects included in the first and second detection hypotheses as well, before the active sensor fusion algorithm outputs a final detection determination, as described herein. In some example embodiments, the determination of convergence of the confidence levels may also include comparing one or more of the confidence levels with one or more confidence thresholds, e.g., determining whether one or more of the confidence levels are above a minimum confidence threshold, before the active sensor fusion algorithm outputs a final detection determination, as described herein.

If the first and second detection hypotheses and/or the first and second confidence levels do not converge, then the process 700 continues to provide the first detection hypothesis to the second detection algorithm, and to provide the second detection hypothesis to the first detection algorithm, as at 718. For example, the first and second detection hypotheses may be provided to the second and first detection algorithms, respectively, using various methods, as described herein, e.g., a detection algorithm may receive all other detection hypotheses, a detection algorithm may receive a detection hypothesis associated with the other detection algorithm that includes differences related detected objects or confidence levels associated with detected objects, or other methods.

The process 700 may then proceed with modifying parameters of the first sensor, the second sensor, the first detection algorithm, and/or the second detection algorithm, as at 720, which is described in further detail with respect to FIG. 5. For example, one or more operational parameters of the first and/or second sensors may be refined, modified, and/or adjusted. In addition, one or more processing parameters of the first and/or second detection algorithms may be refined, modified, and/or adjusted. Further, one or more sensors and/or one or more detection algorithms may be selected for further sensing and/or processing to detect objects within an environment.

The process 700 may then return to step 702 to receive and process sensor data, determine detection hypotheses, and process the detection hypotheses by the active sensor fusion algorithm, based at least in part on the one or more refinements, modifications, and/or adjustments to one or more sensors and/or detection algorithms.

Returning to step 716, if the first and second detection hypotheses and/or the first and second confidence levels converge, then the process 700 continues to provide the final detection determination to a system, as at 722. For example, various types of vehicles, machinery, equipment, or other systems may receive the final detection determination and modify their operations at least partially based on detected objects included in the final detection determination, as described herein. The process 700 may then end, as at 724.

In other example embodiments, it may be possible that the first and second detection hypotheses diverge, that the first and second detection hypotheses do not converge, that the first and second detection hypotheses converge but the first and second confidence levels do not converge, that the first and second confidence levels converge but do not exceed a minimum confidence threshold, and/or other outcomes. In such examples, one or more timeouts or other triggers based on time, number of iterations, processing power, computational load, and/or other metrics may be used to signal an end to the process 700. Other metrics may also relate to an amount or percent of change to one or more detection hypotheses or confidence levels between two or more iterations, such that if such metrics fall below a threshold value, the process 700 may also end. In such example embodiments, the final detection determination may include various data or information from individual sensors and detection algorithms, such as detection hypotheses from individual sensors, confidence levels associated with individual detection hypotheses, rankings of detection hypotheses and/or confidence levels, averages of detection hypotheses and/or confidence levels, differences between detection hypotheses and/or confidence levels, and/or various other combinations, statistical analyses, or other evaluations of at least a portion of the data or information from individual sensors and detection algorithms.

Figure 8:
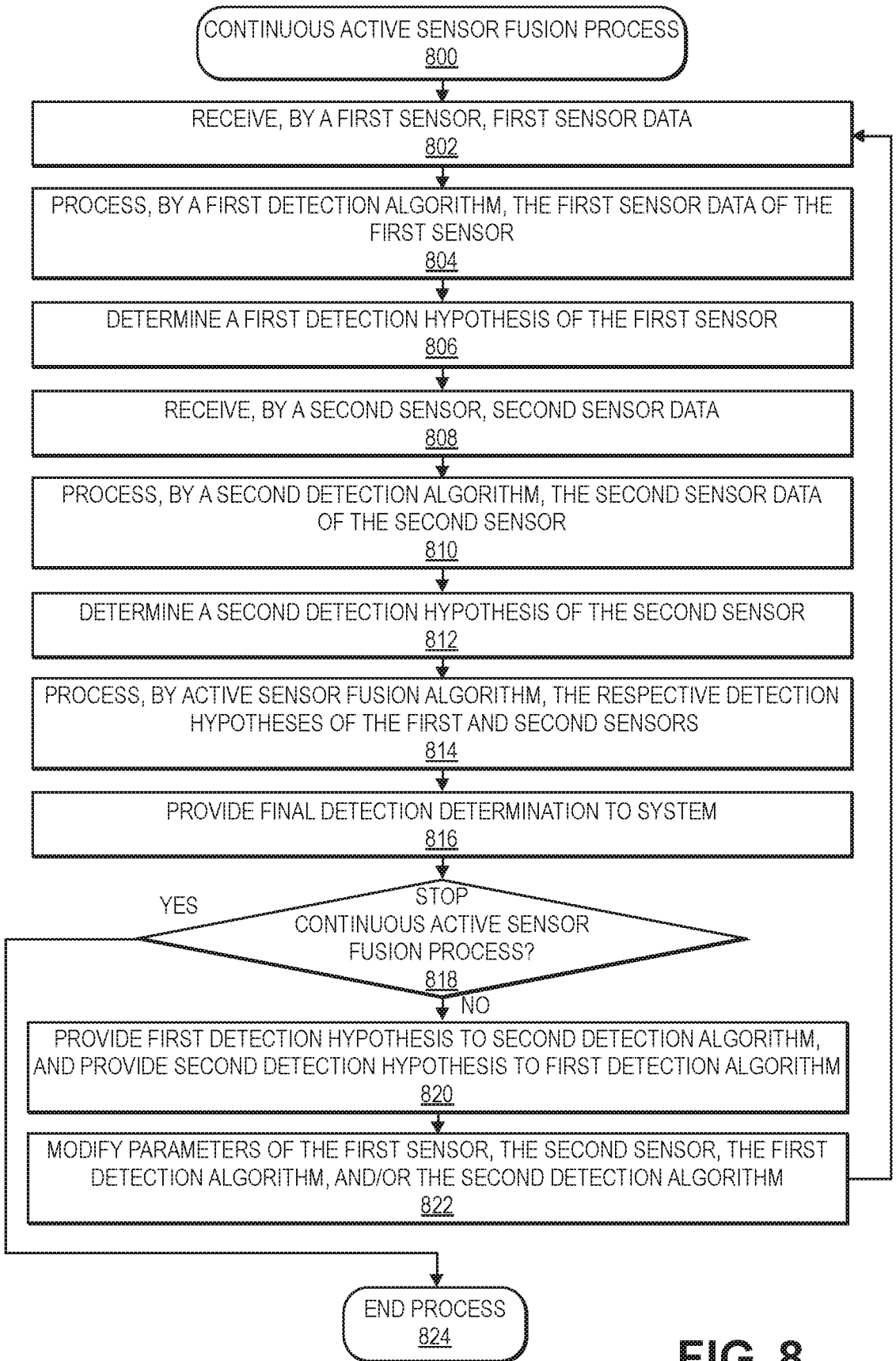
FIG. 8 is a flow diagram illustrating an example continuous active sensor fusion process, in accordance with disclosed implementations.

FIG. 8 is a flow diagram illustrating an example continuous active sensor fusion process 800, in accordance with disclosed implementations.

The process 800 may begin by receiving, by a first sensor, first sensor data, as at 802. For example, an optical imaging sensor may receive optical imaging data of an environment within a field of view. Various other types of sensors may receive various other types of sensor data.

The process 800 may continue by processing, by a first detection algorithm, the first sensor data of the first sensor, as at 804. For example, an optical image processing algorithm may process the optical imaging data from the optical imaging sensor. Various other types of detection algorithms may process various other types of sensor data.

The process 800 may proceed by determining a first detection hypothesis of the first sensor, as at 806. For example, a detection hypothesis may include data associated with one or more detected objects. In addition, a detection hypothesis may also include sensor data, data related to operational parameters of the sensor, and/or data related to processing parameters of the detection algorithm. Various other types of data may also be included in the detection hypothesis.

The process 800 may continue by receiving, by a second sensor, second sensor data, as at 808. For example, an infrared imaging sensor may receive infrared imaging data of an environment within a field of view. Various other types of sensors may receive various other types of sensor data.

The process 800 may proceed by processing, by a second detection algorithm, the second sensor data of the second sensor, as at 810. For example, an infrared image processing algorithm may process the infrared imaging data from the infrared imaging sensor. Various other types of detection algorithms may process various other types of sensor data.

The process 800 may continue by determining a second detection hypothesis of the second sensor, as at 812. For example, a detection hypothesis may include data associated with one or more detected objects. In addition, a detection hypothesis may also include sensor data, data related to operational parameters of the sensor, and/or data related to processing parameters of the detection algorithm. Various other types of data may also be included in the detection hypothesis.

The process 800 may then continue to process, by an active sensor fusion algorithm, the respective detection hypotheses of the first and second sensors, as at 814. For example, the active sensor fusion algorithm may process, analyze, compare, and/or combine the respective detection hypotheses using various methods, as described herein.

The process 800 may then proceed to provide a final detection determination to a system, as at 816. For example, the process 800 may be configured to provide or output a final detection determination continuously or periodically, as described herein, e.g., after each iteration, at each timestep, after periodic intervals, or others. In addition, various types of vehicles, machinery, equipment, or other systems may receive the final detection determination and modify their operations at least partially based on detected objects included in the final detection determination, as described herein.

The process 800 may then proceed to determine whether the continuous active sensor fusion process is to be stopped, as at 818. For example, the continuous active sensor fusion process may be stopped for various reasons, e.g., no further need for final detection determinations from particular sensors or detection algorithms, completion of operations for particular vehicles, equipment, machinery, or systems, or other reasons.

If the continuous active sensor fusion process is not to be stopped, then the process 800 continues to provide the first detection hypothesis to the second detection algorithm, and to provide the second detection hypothesis to the first detection algorithm, as at 820. For example, the first and second detection hypotheses may be provided to the second and first detection algorithms, respectively, using various methods, as described herein, e.g., a detection algorithm may receive all other detection hypotheses, a detection algorithm may receive a detection hypothesis associated with the other detection algorithm that includes differences related detected objects, or other methods.

The process 800 may then proceed with modifying parameters of the first sensor, the second sensor, the first detection algorithm, and/or the second detection algorithm, as at 822, which is described in further detail with respect to FIG. 5. For example, one or more operational parameters of the first and/or second sensors may be refined, modified, and/or adjusted. In addition, one or more processing parameters of the first and/or second detection algorithms may be refined, modified, and/or adjusted. Further, one or more sensors and/or one or more detection algorithms may be selected for further sensing and/or processing to detect objects within an environment.

The process 800 may then return to step 802 to receive and process sensor data, determine detection hypotheses, and process the detection hypotheses by the active sensor fusion algorithm, based at least in part on the one or more refinements, modifications, and/or adjustments to one or more sensors and/or detection algorithms.

Returning to step 818, if the continuous active sensor fusion process is to be stopped, then the process 800 may then end, as at 824. In other example embodiments, the determination of whether to stop the continuous active sensor fusion process, as shown at step 818, may be performed at one or more other points in the process 800, e.g., between steps 820 and 822, between steps 822 and 802, between steps 814 and 816, or at other points in the process 800.

Figure 9:
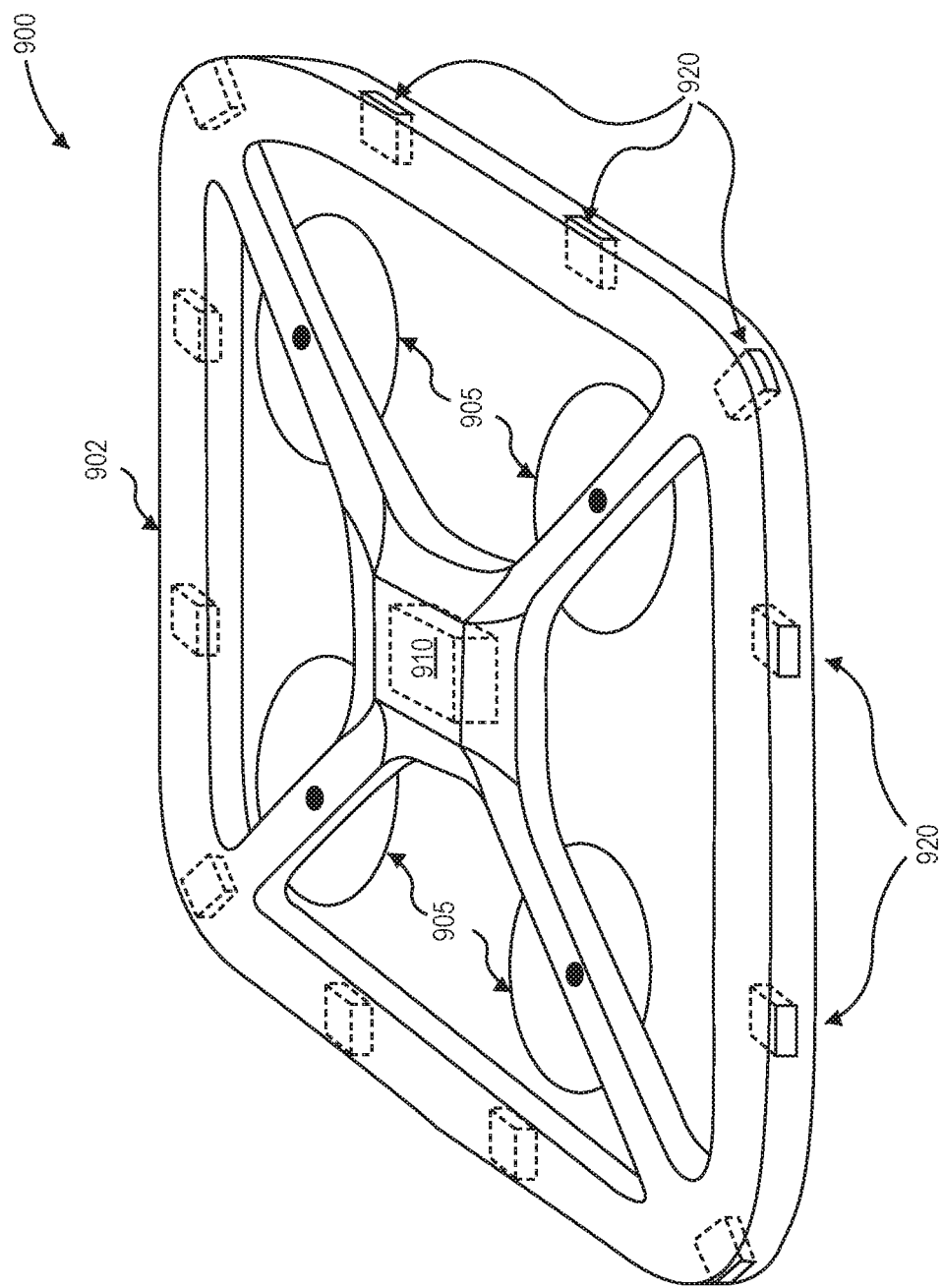
FIG. 9 is a schematic diagram of a perspective view of an example aerial vehicle configured to detect objects with active sensor fusion systems and processes, in accordance with disclosed implementations.

FIG. 9 is a schematic diagram of a perspective view of an example aerial vehicle 900 configured to detect objects with active sensor fusion systems and processes, in accordance with disclosed implementations.

As shown in FIG. 9, the example aerial vehicle 900 may include a frame 902 and a plurality of propulsion mechanisms 905, such as propellers coupled to and rotated by respective motors. By operation of the propulsion mechanisms 905, the example aerial vehicle 900 may takeoff, navigate, maneuver, ascend, descend, rotate, land, and/or perform various other flight or navigational operations. In addition, the aerial vehicle may be configured to receive, lift, carry, transport, and/or release a payload.

The frame 902 may be formed of various materials, such as carbon fiber, plastics, metals, wood, composites, other materials, or combinations thereof. In addition, the propulsion mechanisms 905 may comprise various other types of propulsion mechanisms, such as jets, electric jets, turbines, fans, or others.

Figure 10:
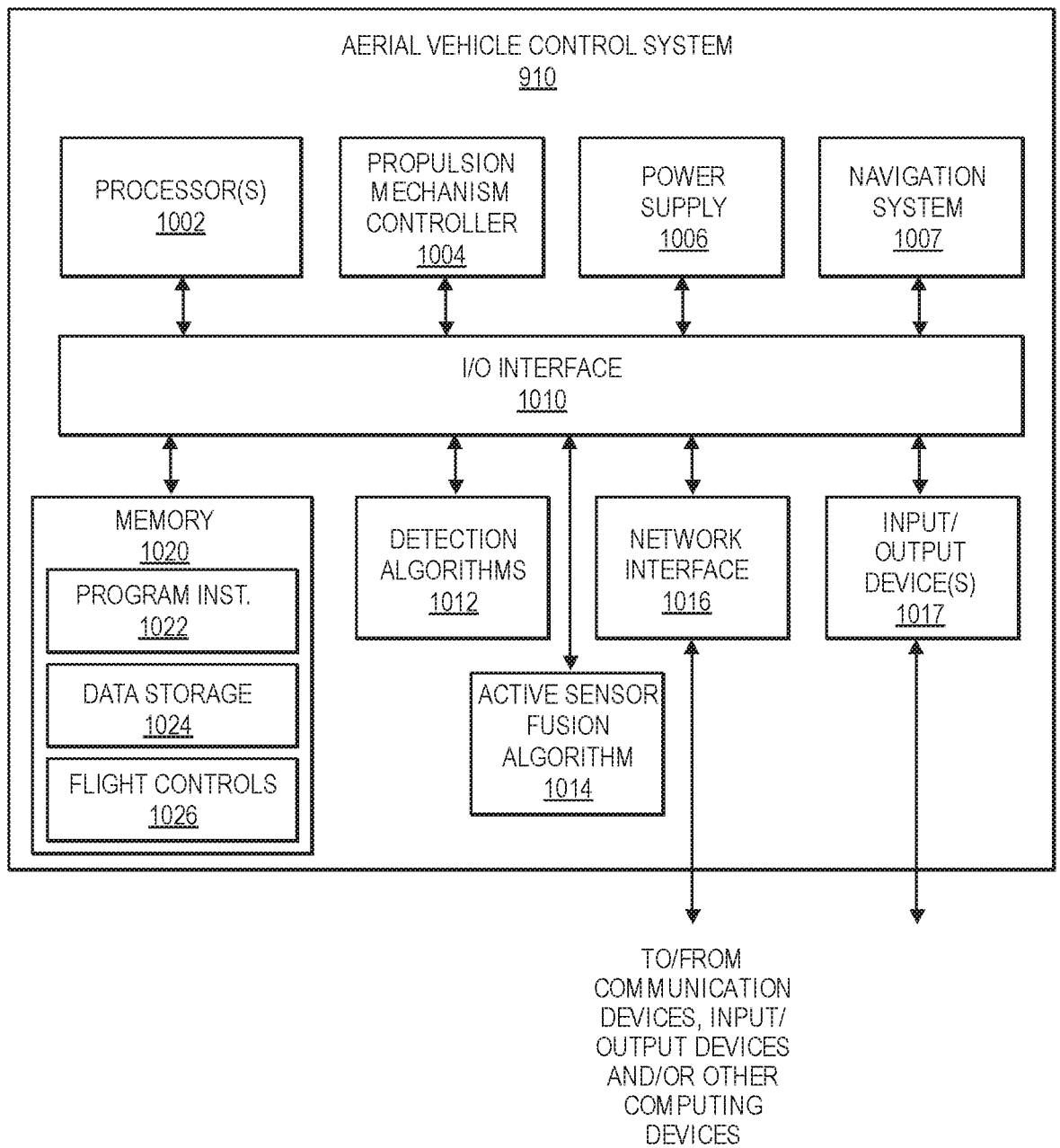
FIG. 10 is a block diagram illustrating various components of an example aerial vehicle control system, in accordance with disclosed implementations.

The example aerial vehicle 900 may also include an aerial vehicle control system 910, as further described with respect to FIG. 10. The aerial vehicle control system 910 may control the flight, navigation, and/or various other operations of the example aerial vehicle 900, e.g., by controlling the propulsion mechanisms 905, and/or by controlling one or more ailerons, flaps, or other control surfaces associated with the aerial vehicle 900.

Further, the example aerial vehicle 900 may include one or more sensors 920. For example, the sensors 920 may comprise various types of sensors, such as optical imaging, infrared, depth, range determination, LIDAR, radar, sonar, contact, pressure, force, or other types of sensors, as described herein. For example, the sensors 920 may be configured to receive sensor data associated with an environment around the example aerial vehicle 900, as described herein.

In addition, the aerial vehicle control system 910 may also include or be communicatively connected to one or more detection algorithms that may receive sensor data from the one or more sensors 920 for processing and/or object detection, as described herein. Further, the aerial vehicle control system 910 may also include or be communicatively connected to an active sensor fusion algorithm that may receive and process detection hypotheses from one or more detection algorithms associated with sensor data from the one or more sensors 920, and that may also feed back detection hypotheses to one or more detection algorithms associated with the one or more sensors 920 in order to more accurately and reliably detect objects within an environment, as described herein. Moreover, the active sensor fusion algorithm may also provide a final detection determination to the aerial vehicle control system 910, such that the aerial vehicle control system 910 may control flight, navigation, or other operations of the aerial vehicle 900 based at least in part on the final detection determination related to objects detected within an environment of the aerial vehicle.

Although the example aerial vehicle 900 is illustrated in FIG. 9 having a particular configuration, as well as number, combination, and arrangement of components, the active sensor fusion systems and methods described herein may be used with various other configurations or arrangements of aerial vehicles. For example, an example aerial vehicle may include various other numbers, combinations, or arrangements of propulsion mechanisms, control systems or components, sensors, wings, frame components, control surfaces, or other elements or components. Moreover, the active sensor fusion systems and methods described herein may be used with various other types of vehicles, machinery, equipment, robotics, or other systems that may utilize final detection determinations related to objects detected within an environment to at least partially modify or adjust their operations, as described herein.

FIG. 10 is a block diagram illustrating various components of an example aerial vehicle control system 910, in accordance with disclosed implementations.

In various examples, the block diagram may be illustrative of one or more aspects of the aerial vehicle control system 910 that may be used to implement the various systems and methods discussed herein and/or to control operation of an aerial vehicle discussed herein. In the illustrated implementation, the aerial vehicle control system 910 includes one or more processors 1002, coupled to a memory, e.g., a non-transitory computer readable storage medium 1020, via an input/output (I/O) interface 1010. The aerial vehicle control system 910 also includes propulsion mechanism controllers 1004, such as electronic speed controls (ESCs) or motor controllers, power modules 1006 and/or a navigation system 1007. The aerial vehicle control system 910 further includes one or more detection algorithms 1012, an active sensor fusion algorithm 1014, a network interface 1016, and one or more input/output devices 1017.

In various implementations, the aerial vehicle control system 910 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, flight paths, flight control parameters, sensor data, operational parameters, detection hypotheses, processing parameters, final detection determinations, and/or other data items accessible by the processor(s) 1002. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1020 as program instructions 1022, data storage 1024 and flight controls 1026, respectively. In other implementations, program instructions, data, and/or flight controls may be received, sent, or stored upon different types of computer-accessible media, such as non-transitory media, or on similar media separate from the non-transitory computer readable storage medium 1020 or the aerial vehicle control system 910. Generally speaking, a non-transitory, computer readable storage medium may include storage media or memory media such as magnetic or optical media, e.g., disk or CD/DVD-ROM, coupled to the aerial vehicle control system 910 via the I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface 1016 or other peripheral interfaces, such as input/output devices 1017. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The propulsion mechanism controllers 1004 may communicate with the navigation system 1007 and adjust the rotational speed, position, orientation, or other parameters of each propulsion mechanism to implement one or more aerial vehicle flight plans or operations, to modify one or more vehicle operations based on detected objects, to stabilize the aerial vehicle, and/or to perform one or more maneuvers and guide the aerial vehicle along a flight path and/or to a destination location.

The navigation system 1007 may include a global positioning system (GPS), indoor positioning system (IPS), or other similar system and/or sensors that can be used to navigate the aerial vehicle to and/or from a location.

The detection algorithms 1012 may receive sensor data from one or more sensors and determine one or more detection hypotheses related to objects detected within an environment. The detection algorithms 1012 may also cause, direct, instruct, or implement one or more changes to processing parameters thereof, and/or to operational parameters of one or more sensors. The detection algorithms 1012 may perform various other operations as described herein.

The active sensor fusion algorithm 1014 may receive and process detection hypotheses related to objects detected within an environment by one or more sensors, provide or feed back detection hypotheses to one or more detection algorithms and associated sensors, cause, direct, instruct, or implement one or more changes to processing parameters of one or more detection algorithms and/or one or more changes to operational parameters of one or more sensors, and make final detection determinations based on received and processed detection hypotheses. The active sensor fusion algorithm 1014 may perform various other operations as described herein.

The network interface 1016 may be configured to allow data to be exchanged between the aerial vehicle control system 910, other devices attached to a network, such as other computer systems (e.g., remote computing resources), and/or with aerial vehicle control systems of other aerial vehicles. For example, the network interface 1016 may enable wireless communication between the aerial vehicle and an aerial vehicle control system that is implemented on one or more remote computing resources. For wireless communication, an antenna of the aerial vehicle or other communication components may be utilized. As another example, the network interface 1016 may enable wireless communication between numerous aerial vehicles. In various implementations, the network interface 1016 may support communication via wireless general data networks, such as a Wi-Fi network. For example, the network interface 1016 may support communication via telecommunications networks, such as cellular communication networks, satellite networks, and the like.

Input/output devices 1017 may, in some implementations, include one or more displays, imaging devices, thermal sensors, infrared sensors, time of flight sensors, accelerometers, pressure sensors, weather sensors, various other sensors and types of sensors described herein, etc. Multiple input/output devices 1017 may be present and controlled by the aerial vehicle control system 910. One or more of these sensors may be utilized to control functions or operations related to flight, navigation, object detection, object tracking, object avoidance, object retrieval, object release, and/or any other operations or functions described herein.

As shown in FIG. 10, the memory may include program instructions 1022, which may be configured to implement the example routines and/or sub-routines described herein. The data storage 1024 may include various data stores for maintaining data items that may be provided for operations and navigation of an aerial vehicle, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 910 is merely illustrative and is not intended to limit the scope of the present disclosure. In particular, the computing system and devices may include any combination of hardware or software that can perform the indicated functions. The aerial vehicle control system 910 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 910. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 910 may be transmitted to the aerial vehicle control system 910 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and control systems should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method to detect objects, comprising:
   receiving, by a plurality of sensors, respective first sensor data;
   processing, by a respective plurality of detection algorithms, the respective first sensor data to determine respective objects detected in the respective first sensor data;
   outputting, by the respective plurality of detection algorithms, respective first detection hypotheses associated with the respective objects detected in the respective first sensor data, each of the respective first detection hypotheses including a respective confidence level associated with each respective object;
   receiving, by an active sensor fusion algorithm, the respective first detection hypotheses;
   processing, by the active sensor fusion algorithm, the respective first detection hypotheses;
   transmitting, by the active sensor fusion algorithm, all the respective first detection hypotheses to individual ones of the plurality of detection algorithms;
   modifying, by the respective plurality of detection algorithms, respective parameters of the plurality of detection algorithms and respective parameters of the plurality of sensors based, at least in part, on all the respective first detection hypotheses and all the respective confidence levels;
   receiving, by the plurality of sensors, respective second sensor data based on the modified respective parameters of the plurality of sensors;
   processing, by the respective plurality of detection algorithms, the respective second sensor data to determine respective objects detected in the respective second sensor data based on the modified respective parameters of the plurality of detection algorithms;
   outputting, by the respective plurality of detection algorithms, respective second detection hypotheses associated with the respective objects detected in the respective second sensor data;
   receiving, by the active sensor fusion algorithm, the respective second detection hypotheses; and
   processing, by the active sensor fusion algorithm, the respective second detection hypotheses to determine respective final objects detected by the plurality of sensors and the plurality of detection algorithms.

2. The computer-implemented method of claim 1, wherein processing, by the active sensor fusion algorithm, the respective first detection hypotheses further comprises at least one of comparing or combining the respective first detection hypotheses to determine objects detected by the plurality of sensors.

3. The computer-implemented method of claim 1, wherein modifying, by the respective plurality of detection algorithms, respective parameters of the plurality of detection algorithms based on all the respective first detection hypotheses further comprises selecting respective portions of the respective second sensor data to process to determine respective objects detected in the respective second sensor data.

4. The computer-implemented method of claim 1, wherein modifying, by the respective plurality of detection algorithms, respective parameters of the plurality of sensors based on all the respective first detection hypotheses further comprises selecting respective sensors of the plurality of sensors to receive the respective second sensor data.

5. A method, comprising:
   receiving, by an active sensor fusion algorithm, a first detection hypothesis from a first detection algorithm configured to process first sensor data received by a first sensor, and a second detection hypothesis from a second detection algorithm configured to process second sensor data received by a second sensor, the first detection hypothesis including a first confidence level and the second detection hypothesis including a second confidence level;
   processing, by the active sensor fusion algorithm, the first detection hypothesis and the second detection hypothesis to determine an object detected by at least one of the first sensor or the second sensor;
   transmitting, by the active sensor fusion algorithm, at least one of the first detection hypothesis to the second detection algorithm or the second detection hypothesis to the first detection algorithm;
   causing modification of at least one parameter of at least one of the first detection algorithm, the second detection algorithm, the first sensor, or the second sensor based at least in part on the at least one of the first detection hypothesis and the first confidence level, or the second detection hypothesis and the second confidence level that is transmitted;
   receiving, by the active sensor fusion algorithm, a third detection hypothesis from the first detection algorithm and a fourth detection hypothesis from the second detection algorithm based at least in part on the at least one parameter that is modified for at least one of the first detection algorithm, the second detection algorithm, the first sensor, or the second sensor; and
   processing, by the active sensor fusion algorithm, the third detection hypothesis and the fourth detection hypothesis to determine an object detected by the first sensor and the second sensor.

6. The method of claim 5, further comprising:
   receiving, by the first sensor, the first sensor data;
   processing, by the first detection algorithm, the first sensor data to determine the first detection hypothesis associated with an object detected by the first sensor;
   receiving, by the second sensor, the second sensor data; and
   processing, by the second detection algorithm, the second sensor data to determine the second detection hypothesis associated with an object detected by the second sensor.

7. The method of claim 5, wherein processing, by the active sensor fusion algorithm, the first detection hypothesis and the second detection hypothesis further comprises at least one of comparing or combining the first detection hypothesis and the second detection hypothesis to determine a plurality of objects detected by at least one of the first sensor or the second sensor.

8. The method of claim 5, wherein causing modification of the at least one parameter of at least one of the first detection algorithm, the second detection algorithm, the first sensor, or the second sensor further comprises selecting a detection algorithm from a plurality of detection algorithms as the first detection algorithm or the second detection algorithm.

9. The method of claim 8, wherein selecting the detection algorithm as the first detection algorithm further comprises selecting the first detection algorithm that is complementary to the second detection algorithm;

wherein the first detection algorithm is configured to process a first type of sensor data that is different than a second type of sensor data configured to be processed by the second detection algorithm.

10. The method of claim 5, wherein causing modification of the at least one parameter of at least one of the first detection algorithm, the second detection algorithm, the first sensor, or the second sensor further comprises modifying at least one processing parameter of the first detection algorithm or the second detection algorithm.

11. The method of claim 5, wherein causing modification of the at least one parameter of at least one of the first detection algorithm, the second detection algorithm, the first sensor, or the second sensor further comprises selecting a sensor from a plurality of sensors as the first sensor or the second sensor.

12. The method of claim 11, wherein selecting the sensor as the first sensor further comprises selecting the first sensor that is complementary to the second sensor;
wherein the first sensor is associated with a first failure mode that is different than a second failure mode associated with the second sensor.

13. The method of claim 5, wherein causing modification of the at least one parameter of at least one of the first detection algorithm, the second detection algorithm, the first sensor, or the second sensor further comprises modifying at least one operational parameter of the first sensor or the second sensor.

14. The method of claim 5, wherein processing, by the active sensor fusion algorithm, the third detection hypothesis and the fourth detection hypothesis to determine an object detected by the first sensor and the second sensor further comprises at least one of:
determining zero objects detected by the first sensor and the second sensor;
determining a same object detected by the first sensor and the second sensor; or
determining a same plurality of objects detected by the first sensor and the second sensor.

15. The method of claim 5, wherein the object detected by the first sensor and the second sensor is determined based at least in part on a third confidence level associated with the third detection hypothesis and a fourth confidence level associated with the fourth detection hypothesis.

16. The method of claim 5, wherein the object detected by the first sensor and the second sensor is determined based at least in part on at least one of a time duration or a number of iterations by the active sensor fusion algorithm.

17. The method of claim 5, further comprising:
instructing modified operation of a system based at least in part on the object detected by the first sensor and the second sensor;
wherein the system comprises at least one of a vehicle, an automated machine, a semi-autonomous equipment, or a robotic apparatus.

18. A system, comprising:
a processor; and
a memory comprising executable instructions, which, when executed by the processor, cause the processor to at least:
receive a first detection hypothesis from a first detection algorithm configured to process first sensor data received by a first sensor, and a second detection hypothesis from a second detection algorithm configured to process second sensor data received by a second sensor, the first detection hypothesis including a first confidence level and the second detection hypothesis including a second confidence level;
process the first detection hypothesis and the second detection hypothesis to determine an object detected by at least one of the first sensor or the second sensor;
transmit at least one of the first detection hypothesis to the second detection algorithm or the second detection hypothesis to the first detection algorithm;
cause modification of at least one parameter of at least one of the first detection algorithm, the second detection algorithm, the first sensor, or the second sensor based at least in part on the at least one of the first detection hypothesis and the first confidence level, or the second detection hypothesis and the second confidence level that is transmitted;
receive a third detection hypothesis from the first detection algorithm and a fourth detection hypothesis from the second detection algorithm based at least in part on the at least one parameter that is modified for at least one of the first detection algorithm, the second detection algorithm, the first sensor, or the second sensor; and
process the third detection hypothesis and the fourth detection hypothesis to determine an object detected by the first sensor and the second sensor.

19. The system of claim 18, wherein the object detected by the first sensor and the second sensor is determined based on a convergence between the third detection hypothesis and the fourth detection hypothesis.

20. The system of claim 19, wherein the convergence includes the third detection hypothesis and the fourth detection hypothesis indicating a same number of detected objects.

21. The system of claim 19, wherein the convergence includes a further convergence of a third confidence level associated with the third detection hypothesis and a fourth confidence level associated with the fourth detection hypothesis.

22. The system of claim 18, wherein the object detected by the first sensor and the second sensor is determined based on a union between the third detection hypothesis and the fourth detection hypothesis to maintain safe operation of a system with respect to the object detected by the first sensor and the second sensor.

* * * * *